US009843365B2

(12) United States Patent
Pelletier et al.

(10) Patent No.: US 9,843,365 B2
(45) Date of Patent: *Dec. 12, 2017

(54) SELECTION OF TRANSMISSION PARAMETERS FOR TRANSMIT DIVERSITY TERMINALS

(75) Inventors: Benoit Pelletier, Roxboro (CA); Hong O. Zhang, Manalapan, NJ (US); Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 457 days.

This patent is subject to a terminal disclaimer.

(21) Appl. No.: 13/340,924

(22) Filed: Dec. 30, 2011

(65) Prior Publication Data

US 2012/0177089 A1 Jul. 12, 2012

Related U.S. Application Data

(60) Provisional application No. 61/430,769, filed on Jan. 7, 2011, provisional application No. 61/441,928, filed on Feb. 11, 2011, provisional application No. 61/523,028, filed on Aug. 12, 2011, provisional application No. 61/541,691, filed on Sep. 30, 2011.

(51) Int. Cl.
*H04B 1/38* (2006.01)
*H04B 7/0417* (2017.01)

(52) U.S. Cl.
CPC .................. *H04B 7/0417* (2013.01)

(58) Field of Classification Search
CPC ............... H04W 76/02; H04W 76/025; H04W 76/045; H04B 1/40; H04B 3/23
USPC .................. 375/219, 260; 370/329
See application file for complete search history.

(56) References Cited

U.S. PATENT DOCUMENTS

| 8,169,973 | B2 | | 5/2012 | Palenius et al. | |
| 8,345,617 | B2 | * | 1/2013 | Bharadwaj et al. | 370/329 |
| 8,358,614 | B2 | * | 1/2013 | Pani et al. | 370/328 |
| 8,400,935 | B2 | | 3/2013 | Pelletier et al. | |
| 8,457,056 | B2 | * | 6/2013 | Zhang et al. | 370/329 |
| 8,467,822 | B2 | * | 6/2013 | Sägfors et al. | 455/522 |
| 8,964,868 | B2 | | 2/2015 | Shin et al. | |

(Continued)

FOREIGN PATENT DOCUMENTS

| CN | 101346923 | 1/2009 |
| CN | 101938786 | 1/2011 |

(Continued)

OTHER PUBLICATIONS

"3rd Generation Partnership Project;Technical Specification Group Radio Access Network;Medium Access Control (MAC) protocol specification (Release 9)", 3GPP TS 25.321 9.4.0, Section 11.8, Annex C, Sep. 2010, 194 pages.

(Continued)

*Primary Examiner* — Helene Tayong
(74) *Attorney, Agent, or Firm* — Theodore Naccarella

(57) ABSTRACT

Disclosed herein are system and method embodiments for selection of transmission parameters for transmit diversity terminals. According to an aspect, a method for controlling wireless receive/transmit unit transmission parameters may include configuring a WRTU to transmit dual stream when a first stream is using a predetermined transport format (TF) or subset of the TF. The method may also include applying the configuration to the WRTU.

24 Claims, 15 Drawing Sheets

(56) References Cited

U.S. PATENT DOCUMENTS

| | | | |
|---|---|---|---|
| 2004/0008703 | A1 | 1/2004 | Kim et al. |
| 2006/0039312 | A1 | 2/2006 | Walton et al. |
| 2008/0043867 | A1* | 2/2008 | Blanz et al. .................. 375/260 |
| 2008/0102876 | A1* | 5/2008 | Karlsson ...................... 455/522 |
| 2009/0163158 | A1* | 6/2009 | Chitrapu et al. ........... 455/127.5 |
| 2009/0257342 | A1 | 10/2009 | Lin et al. |
| 2009/0257394 | A1* | 10/2009 | Chun et al. ................... 370/329 |
| 2009/0262695 | A1 | 10/2009 | Chen et al. |
| 2009/0262856 | A1 | 10/2009 | Onggosanusi et al. |
| 2009/0268707 | A1* | 10/2009 | Pani et al. .................... 370/345 |
| 2009/0285187 | A1* | 11/2009 | Leroy et al. .................. 370/336 |
| 2009/0300456 | A1* | 12/2009 | Pelletier et al. .............. 714/749 |
| 2010/0111023 | A1* | 5/2010 | Pelletier et al. .............. 370/329 |
| 2010/0113004 | A1* | 5/2010 | Cave et al. ................. 455/422.1 |
| 2010/0135242 | A1 | 6/2010 | Nam et al. |
| 2010/0157895 | A1* | 6/2010 | Pani et al. .................... 370/328 |
| 2011/0105174 | A1* | 5/2011 | Pelletier et al. .............. 455/522 |
| 2011/0263281 | A1 | 10/2011 | Cai et al. |
| 2012/0026985 | A1* | 2/2012 | Ren et al. ..................... 370/336 |
| 2012/0281642 | A1* | 11/2012 | Sambhwani ........ H04W 52/325 370/329 |

FOREIGN PATENT DOCUMENTS

| | | |
|---|---|---|
| EP | 2437565 | 4/2012 |
| WO | WO-2007/051192 | 5/2007 |
| WO | WO-2007/095102 | 8/2007 |
| WO | WO-2010/051514 | 5/2010 |
| WO | WO-2010/051520 | 5/2010 |
| WO | WO-2010/075872 A1 | 7/2010 |
| WO | WO-2010/091421 | 8/2010 |
| WO | WO-2010/095884 | 8/2010 |

OTHER PUBLICATIONS

"3rd Generation Partnership Project;Technical Specification Group Radio Access Network;Multiplexing and channel coding (FDD) (Release 9)", 3GPP TS 25.212 9.3.0, Section 4.8.4.1, Sep. 2010, 108 pages.

"3rd Generation Partnership Project;Technical Specification Group Radio Access Network;Requirements for support of radio resource management (FDD)", 3GPP TS 25.133 9.5.0, Section 6.4, Sep. 2010, 250 pages.

"International Search Report and Written Opinion", PCT/US2011/068041, 12 pages.

"3rd Generation Partnership Project;Technical Specification Group Radio Access Network; Requirements for support of radio resource management (FDD)", 3GPP TS 25.133 9.5.0, Section 6.4, Sep. 2010, 250 pages.

"International Search Report and Written Opinion", PCT/US2011/068041, Mailing date: May 14, 2012; 12 pages.

"3rd Generation Partnership Project; Technical Specification Group Radio Access Network; Spreading and modulation (FDD) (Release 10)", 3GPP TS 25.213 V10.0.0, Sep. 2010, 39 pages.

"Universal Mobile Telecommunications System (UMTS); Medium Access Control (MAC) protocol specification", 3GPP TS 25.321 v10.3.0 Release 10, Jul. 2011, 202 pages.

"Universal Mobile Telecommunications System (UMTS); Physical layer procedures (FDD)", 3GPP TS 25.214 v10.3.0, Jul. 2011, 102 pages.

"Chinese Office Action", Chinese Application No. 201180064389.0, dated Aug. 5, 2015, 4 pages.

"Chinese Office Action (English Translation)", Chinese Application No. 201180064389.0, dated Aug. 5, 2015, 10 pages.

"Japanese Official Notice of Rejection", Japanese Application No. 2013-548440, dated May 12, 2015, 3 pages.

"Japanese Official Notice of Rejection (English Translation).", Japanese Application No. 2013- 548440, dated May 12, 2015, 4 pages.

"Taiwanese Office Action", Taiwanese Application No. 101100040, dated Nov. 12, 2015, 6 pages.

"Taiwanese Office Action (English Translation)", Taiwanese Application No. 101100040, dated Nov. 12, 2015, 4 pages.

"United States Office Action", U.S. Appl. No. 14/689,967, dated Nov. 9, 2016, 22 pages.

"United States Final Office Action", U.S. Appl. No. 14/689,967, dated May 11, 2017, 18 pages.

"Israeli Office Action", Israeli Application No. 227362, Jul. 12, 2017, 3 pages.

"Israeli Office Action (English Translation)", Istraeli Application No. 227362, Jul. 12, 2017, 3 pages.

* cited by examiner

SELECTION OF TRANSMISSION PARAMETERS FOR TRANSMIT DIVERSITY TERMINALS

CROSS REFERENCE TO RELATED APPLICATIONS

This application claims the benefit of U.S. Provisional Application No. 61/430,769, entitled "SELECTION OF TRANSMISSION PARAMETERS FOR TRANSMIT DIVERSITY TERMINALS", filed Jan. 7, 2011; U.S. Provisional Application No. 61/441,928, entitled "SELECTION OF TRANSMISSION PARAMETERS FOR TRANSMIT DIVERSITY TERMINALS", filed Feb. 11, 2011; U.S. Provisional Application No. 61/523,028, entitled "SELECTION OF TRANSMISSION PARAMETERS FOR TRANSMIT DIVERSITY TERMINALS", filed Aug. 12, 2011; and U.S. Provisional Application No. 61/541,691, entitled "SELECTION OF TRANSMISSION PARAMETERS FOR TRANSMIT DIVERSITY TERMINALS", filed Sep. 30, 2011, each of which is incorporated herein by reference.

BACKGROUND

Multiple antenna transmission/reception techniques with advanced signal processing algorithms are often collectively referred to as multi-input multi-output (MIMO) technology. MIMO has been widely studied and can significantly improve the performance of wireless communication systems. A fundamental MIMO scheme is that of pre-coded spatial multiplexing where multiple information streams are transmitted simultaneously. Such stream multiplexing approaches are typically appropriate in high signal to interference plus noise ratio (SINR) situation and improve the peak rates and spectrum efficiency. Spatial multiplexing is augmented with techniques such as beamforming and transmit diversity to increase the coverage when the channel conditions become less favorable to spatial multiplexing. For channel dependent pre-coding, the weighs are typically selected to distribute the transmission into "directions" which maximizes the power at the receiver. Using appropriate pre-coding operation can reduce the inter-stream interference but requires feedback signaling from the receiver (closed-loop). For channel independent pre-coding, transmit diversity could be achieved by varying the weights combined with channel coding and interleaving; these pre-coding techniques do not require feedback from the receiver (open loop).

SUMMARY

In one embodiment, a method for determining a transmission rank include detecting, by a wireless receive/transmit unit (WRTU), two grant signals on different downlink physical channels and determining, by the WRTU, transmission rank based on the detection.

In one embodiment, a method for determining a transmission rank includes, determining, by a wireless receive/transmit unit (WRTU), to request a higher transmission rank, and communicating, by the WRTU, a request for a higher transmission rank based on the determination.

In one embodiment, a method for controlling a wireless receive/transmit unit (WRTU) transmission parameters includes configuring the WRTU to determine when a first stream is using a predetermined transport format (TF) or subset of the TF, and configuring the WRTU to transmit dual stream when the first stream is using the predetermined TF or a subset of the TF.

In one embodiment, a method for controlling a wireless receive/transmit unit (WRTU) transmission parameters includes determining, by the WRTU, if a first stream is using a predetermined transport format (TF) or subset of the TF, and when the first stream is using the predetermined TF or a subset of the TF, transmitting dual stream.

In one embodiment, a method for controlling wireless receive/transmit unit (WRTU) transmission parameters includes configuring a WRTU determine when a first stream is using a predetermined modulation scheme, and configuring the WRTU to transmit dual stream when the first stream is using the predetermined modulation scheme.

In one embodiment, a method for controlling wireless receive/transmit unit (WRTU) transmission parameters includes determining, by the WRTU, if a first stream is using a modulation scheme and when the first stream is using the predetermined modulation scheme, transmitting dual stream.

In one embodiment, a method for transport format selection and transmission includes receiving, a wireless receive/transmit unit (WRTU), an indication of a difference in a signal-to-noise ratio (SNR) between a first stream and a second streams used by the WRTU; and responsive to the difference in SNR, applying a repetition technique to the second stream according to a predetermined ratio.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
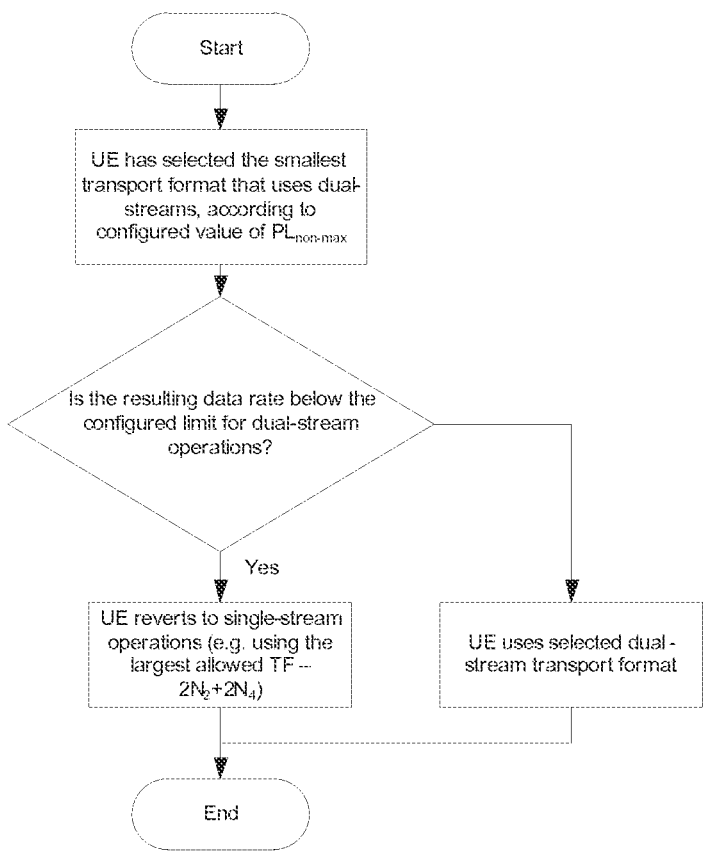
FIG. 1 is a flow chart that illustrates MIMO transport format selection.

Multiple antenna techniques have been adopted in many wireless communication systems, such as IEEE standard 802.11n based wireless local area network access points and cellular systems like wideband code division multiple access/high-speed downlink packet access (WCDMA/HSPA) and 3GPP long term evolution (LTE). MIMO is introduced in WiMAX specification as well as in 3GPP specification, for example in Release 7 of the UTRAN (HSPA) and Release 8 of the E-UTRAN (LTE). More advanced MIMO enhancements are currently being studied for 3GPP Release 9 and 10. However, only downlink (DL) MIMO was introduced in Release 7 for HSPA, there is no uplink (UL) MIMO introduced in HSPA. With rapid increase requirements for high data rate services and larger coverage in the uplink, there is a need to investigate the signaling aspects to support multi-antenna transmission scheme with pre-coding for high-speed uplink packet access (HSUPA).

Currently, only DL MIMO is specified in 3GPP standard and implemented WCDMA HSPA system. With the evolution of HSPA, more and more applications require better uplink performance such as higher throughput and extended coverage.

In accordance with embodiments of the present disclosure, systems and methods are provided for controlling WRTU transmission parameters, for calculating a set of supported E-TFCs, for determining transmission rank, for determining enhanced transport format combination (E-TFC) selections, and for selecting transport format. The system and method embodiments disclosed herein may be used individually or in any suitable combination.

By way of background, HSUPA was originally designed for single stream operations. In conventional HSUPA, the wireless receive/transmit unit (WRTU) determines the transport block size (TBS) to use for transmission based on a number of parameters. Some of these parameters may be dynamically signaled by the network, others are semi-static or static and other parameters are dynamic and only known to the WRTU. A set of procedures in the 3GPP specifications describe the exact WRTU behavior and TBS selection rules for the enhanced dedicated channel (E-DCH). The E-TFC restriction and the transport format selection collectively describe the overall WRTU behavior for selecting the format and the information to transmit.

These rules have been designed for single stream operations, where at any TTI the WRTU only transmits data stream from its antenna(s). It is desirable to change the existing rules in order to support multi-stream operations in E-DCH (also referred here as to dual-stream or UL MIMO). At a high level, the problem to resolve consists of designing rules and procedures for the WRTU to determine the amount of data, the power and transport format/code rate for each streams in dual-stream transmissions.

Many varieties of dual-streams operations can be devised, for example any combination of the following options may be considered, including, but not limited to, 1 or 2 codewords transmitted simultaneously, 1 or 2 inner loop power control (ILPC), single or dual grants, etc.

To each particular variety, a set of procedures and methods are required for the WRTU to determine how to operate. The present disclosure describes, in part, systems, methods and procedures that may be used in any combination to address various aspects of the problem. As is to be appreciated, a full solution may consist of one or a combination of the systems, methods and procedures described herein.

Note that the terms E-DCH transport format combination (E-TFC) and E-DCH transport format combination index have a one to one mapping and may be used interchangeably herein. Also, it is noted that the terms single stream transmission and rank-1 transmission are equivalent and may be used interchangeably herein, and similarly the terms dual stream transmission and rank-2 transmissions are also equivalent and may be used interchangeably herein.

In the context of dual stream transmission, the first or primary stream is associated to the preferred pre-coding weight vector indicated by the network or serving cell. The second or secondary stream is associated to the other and potentially orthogonal pre-coding weight vector. Without loss of generality, it is assumed in the present disclosure, and merely to simplify the description, that the channel conditions associated to the primary weight vector are better than those associated to the secondary weight vector.

When referring to 16QAM operations in the context of WCDMA uplink or HSUPA, it may equivalently also refer to dual-binary or dual 4-PAM transmissions, or higher order modulation (HOM). Likewise, the term QPSK may also be equivalent in this context to dual-binary modulation or dual-BPSK.

Furthermore, references to an E-DCH transport format combination (E-TFC) herein may be equivalent to an E-TFC Index (E-TFCI), depending on the context.

1. Example Techniques for Controlling WRTU Transmission Parameters

In some embodiment, a second stream format may be linked to the primary stream transport format. In accordance with an embodiment for controlling WRTU transmission parameters, a WRTU may be configured to transmit dual stream only when a first stream is using a specific transport format (TF), or subset of the transport format available. In an example, a WRTU may be configured to use dual stream in combination with the largest transport format available, that is two E-DPDCH codes with spreading factor 2 with two E-DPDCH codes with spreading factor 4 (this TF is referred to as $2SF_2+2SF_4$ herein). The WRTU may be further configured to always use the same modulation scheme on both streams. In addition, and optionally, the WRTU may also be configured to use dual stream operations only with a specific modulation scheme. For instance, dual stream operations may only be used in combination with QPSK or 16QAM operations.

By configuring the WRTU with this set of rules, signaling of downlink parameters may be reduced. In an embodiment, when the WRTU is configured (in a static way) to use a specific TF, modulation, and power offset with dual stream operations, the WRTU may only then require a single dynamic parameter configuration to establish the amount of data to transmit on the secondary stream. This parameter may represent the number of bits supported (e.g. a transport block size (TBS)), a power or SIR offset that may be used by the WRTU to determine the amount of data it can transmit on the secondary stream, or a code rate which may also be used by the WRTU to determine the amount of data it can transmit on the secondary stream, for example. This additional parameter may be signaled dynamically by the network on an existing channel for example by reinterpreting the meaning of the information carried, or on a new channel altogether.

2. Example Techniques to Calculate the Set of Supported E-TFCS

In at least one procedure, a WRTU may calculate the set of supported and blocked E-TFCs. This may be carried out by estimating the amount of power available for E-DCH for the following TTI. Then based on this amount, which is expressed as a power ratio or more specifically a so-called Normalized Remaining Power Margin (NRPM), the WRTU may calculate for each E-TFCI whether or not it can be transmitted based on the normalized power (e.g. determine the set of supported E-TFCIs); this is achieved by comparing the NRPM to the required (normalized) power for each E-TFCI.

The WTRU may calculate the gain factor for each E-TFCI based on a set of reference E-TFCI and associated power offsets. In one embodiment, the WTRU is configured to use one set of reference E-TFCI and associated power offsets for single-stream transmission (e.g. the conventional set of reference E-TFCI and associated power offsets) and another set of reference E-TFCI and associated power offsets for dual-stream transmission. In another embodiment, the WTRU is configured to use one set of reference E-TFCI and associated power offsets for the primary stream and another set of reference E-TFCI and associated power offsets for the secondary stream transmission. In yet another embodiment, the WTRU is configured to use three sets of reference E-TFCI and associated power offsets; a first set is used for single-stream transmission, another set is used for the primary stream during dual-stream transmission and a third set is used for the secondary stream during dual-stream transmissions. Which method to use may be determined by an analysis of the performance benefits (e.g. via link-level simulations) and the associated cost (in terms of RRC signaling load). Although most examples in this application are described with a single set of reference E-TFCI and associated power offsets (from which gain factors can be deduced), it should be understood that different sets of reference E-TFCI and associated power offsets may also be used.

The normalized remaining power margin calculation procedure may calculate the normalized remaining power for each E-TFCI index j ($NRPM_j$) using equation (1):

$$NRPM_j = (PMax_j - P_{DPCCH,target} - P_{DPDCH} - P_{HS-DPCCH} - P_{E-DPCCH,j})/P_{DPCCH,target} \quad (1)$$

where the variables are defined as:
$PMax_j$: the maximum power available for transmission, accounting for possible maximum power reduction for $E\text{-}TFC_j$;
$P_{DPCCH,target}$: the estimated DPCCH power target;
$P_{DPDCH}$: the power of the DPDCH (it is to be understood that if DPDCH transmissions are not allowed with MIMO or transmit diversity schemes then this term will not be present in this embodiment or on the embodiments described herein);
$P_{HS-DPCCH}$: the power of the HS-DPCCH; and
$P_{E-DPCCH,j}$: the power of the E-DPCCH for $E\text{-}TFC_j$ (that is, E-DPCCH power boosting is taken into account).

Once the NRPM is calculated for each $E\text{-}TFC_j$, the WRTU can then determine whether or not $E\text{-}TFCI_j$ is supported (that is the WRTU has sufficient power to transmit it) or blocked (the WRTU does not have sufficient power to transmit it). This is achieved by comparing the $NRPM_j$ to the required power ratio for $E\text{-}TFC_j$ (as defined via the reference power offset table signaled to the WRTU by the network). In the case that the target E-DCH TTI for which E-TFC restriction is being considered does not belong to a compressed mode frame then if $NRPM_j \geq \Sigma(\beta_{ed,j}/\beta_c)^2$ then $E\text{-}TFC_j$ can be supported, otherwise it cannot be supported. In the case that the target E-DCH TTI for which E-TFC restriction is being considered belongs to a compressed mode frame then if $NRPM_j \geq \Sigma(\beta_{ed,C,j}/\beta_{c,C})^2$ then $E\text{-}TFC_j$ can be supported, otherwise it cannot be supported. $\beta_{ed,j}/\beta_c$ and $\beta_{ed,C,j}/\beta_{c,C}$ are the quantized amplitude ratios. It is noted that while various embodiments described herein are in terms of non-compressed frames, this disclosure is not so limited. As is to be appreciated, the systems and methods described herein may equivalently apply to compressed frames. Thus, while $\beta_{ed,C,j}/\beta_{c,C}$ will not be used in the description below, anything that applies to $\beta_{ed,j}/\beta_c$ may also applies to $\beta_{ed,C,j}/\beta_{c,C}$.

When a WRTU is configured in MIMO mode for uplink transmission, to minimize the WRTU transmit power and also the interference experienced at Node B, it is beneficial to give the WRTU the flexibility to decide for the next TTI whether single stream or dual stream transmission is appropriate. In one approach to support this feature, the E-DCH transmission in the next TTI may run the E-TFC restriction procedure twice, one by assuming single stream transmission, the other by assuming dual stream transmission. It is noted that since additional physical channels may be required to support MIMO operation, the conventional E-TFC restriction procedures needs to be modified; this is addressed herein below. In short, one example E-TFC restriction procedure for uplink MIMO operation may be as follows. Execute the E-TFC restriction procedure described below with reference to E-TFC Restriction Procedure for Rank-One Transmission with the assumption that the next transmission is rank-one or single-stream transmission. Execute the E-TFC restriction procedure defined below with reference to treating both streams simultaneously (e.g., for dependent stream) or the procedure defined below with reference to calculating the set of supported E-TFC's independently for each with the assumption that the next transmission is rank-two or dual-stream transmission.

In an another method when the WTRU is configured in MIMO mode for uplink transmission, the WTRU is configured with a primary stream E-TFCI rank-1/rank-2 threshold value (E-TFCIthres1-2), or a set of primary stream E-TFCI rank-1/rank-2 threshold values (one for each HARQ offset 1: E-TFCIthresh1-2,1). The WTRU then calculates the set of supported E-TFCIs for rank-1 transmission only for the E-TFCI that are below the threshold for the primary stream and the set of supported E-TFCIs for rank-2 transmission only for the E-TFCIs that are above (or equal to) the threshold. This approach may allow reducing the computations for the E-TFC restriction procedure as the set of candidate E-TFCIs under consideration is reduced. The threshold values may be configured via RRC signaling or alternatively may be fixed in the specifications.

In one example, the WTRU determines the threshold based on a minimum transport block size for the secondary stream. For example the threshold may be determined by the WTRU as the minimum E-TFCI combination supporting dual stream transmission; that is the minimum E-TFCI combination for a specific secondary stream power offset for which the supported TB on the secondary stream is larger than or equal to the minimum allowed TB on the secondary stream. Optionally, the WTRU may carry out this calculation based on the HARQ offset associated to the highest priority non-empty logical channel. In the following, the methods for calculating the set of supported and blocked E-TFCs are disclosed for rank one and rank-two transmission, respectively. These methods (or part of these methods) may be used individually or in any suitable combination.

It is noted that in addition to the DPCCH, or the first DPCCH, DPCCH1, a second pilot channel may be needed for MIMO operation; this additional control channel is referred to as the secondary DPCCH (S-DPCCH), or DPCCH2 herein. Without loss of the generality, it is assumed herein that DPCCH1 is always associated with the primary stream that is transmitted over the strong eigen-channel, or is precoded with the primary precoding weight vector, and DPCCH2 is associated with the secondary stream that is transmitted over the weak eigen-channel, or is precoded with the secondary precoding weight vector.

2.1 Example E-TFC Restriction Procedure for Rank-One Transmission

In accordance with an embodiment, NRPM calculation is provided. As when DPCCH2 is present., the NRPM calculation above may take into account the power of the second DPCCH and DPCCH2 gating cycle, for instance as follows With second DPCCH, the NRPM for E-TFC candidate j is calculated as:

$$NRPM_j = \frac{PMax_j - P_{DPDCH} - P_{PDPCCH1,target} - P_{DPCCH2} - P_{HS-DPCCH} - P_{E-DPCCH,j}}{P_{DPCCH1,target}}$$

where DPCCH1 is the primary or first DPCCH that is precoded together with HS-DPCCH, E-DPCCH, DPDCH, and E-DPDCHs, and DPCCH2 is the secondary DPCCH.

If DPCCH2 is always transmitted together with DPCCH1, $P_{DPCCH2}$ is the estimated DPCCH2 transmit power, based on $P_{DPCCH1,target}$ and a gain factor γ signaled from higher layers. For example, $P_{DPCCH2}=\gamma^2 * P_{DPCCH1,target}$.

If DPCCH2 is not present in all the slots for the TTI under consideration, that is DPCCH2 gating is enabled, the following techniques can be used to calculate $P_{DPCCH2}$. For example, in a first technique, the estimated DPCCH2 transmit power $P_{DPCCH2}$ is based on $P_{DPCCH1,target}$, a gain factor γ signaled from higher layers and the number of slots N that is not DTXed within the TTI for the next upcoming transmission. For example, $P_{DPCCH2}=(N/N_{TTI})*\gamma^2 * P_{DPCCH1,target}$, where $N_{TTI}=3$ for 2 ms TTI, $N_{TTI}=15$ for 10 ms TTI.

In a second technique, the estimated DPCCH2 transmit power $P_{DPCCH2}$ is based on $P_{DPCCH1,target}$, a gain factor γ signaled from higher layers and DPCCH2 DTX cycle which is defined as the ratio between the number of transmitted or non-DTXed DPCCH2 slot $N_{tx}$ and the number of slots $N_{frame}$ of one radio frame. For example, $P_{DPCCH2}=(N_{tx}/N_{frame})*\gamma^2 * P_{DPCCH1,target}$, with $N_{frame}=15$.

In a third technique, the estimated DPCCH2 transmit power $P_{DPCCH2}$ is based on $P_{DPCCH1,target}$, and a gain factor γ signaled from higher layers. For example, $P_{DPCCH2}=\gamma^2 * P_{DPCCH1,target}$, where the gain factor γ may be the same or different than the gain factor when no gating is being applied.

In a fourth technique, the estimated DPCCH2 transmit power $P_{DPCCH2}$ is always 0.

In a fifth technique, the estimated DPCCH2 transmit power is based on $P_{DPCCH1,target}$, and the E-TFCI transmitted. In one particular example for single-stream transmission, the estimated DPCCH transmit power depends on the E-TFC of the primary stream E-DPDCH.

It should be noted that the power may refer to the one measured before precoding. If the current transmission is rank-two transmission, after estimating current DPCCH1 power, the DPCCH1 power before being used to calculate NRPM and powers of other physical channels may be scaled by a factor which may be signaled from higher layer or derived from DL layer 1 signaling; similarly, the E-DPCCH power is evaluated based on the gain factor Δedpcch targeted for rank-1 transmission and scaled DPCCH1 power.

2.2 Example E-TFC Restriction Procedure for Rank-Two Transmission 2.2.1 Jointly (Treating Both Streams Simultaneously)

2.2.1.1 Dual Transport Blocks

In this example technique, the WRTU may calculate the set of supported E-TFCIs considering both streams simultaneously, each corresponding to one transport block. In a first example procedure for this technique, the WRTU may calculate the NRPM for each HARQ offset configured or under considerations assuming dual stream transmission. The WRTU may calculate the $NRPM_{i,j}$ for each E-TFCIs combinations for which dual-stream transmission is supported. Optionally, the WTRU may restrict the calculation of the NRPM only to allowed combinations of E-TFCIs; the WTRU then considers the disallowed E-TFCI combinations as blocked. For example when the WTRU is configured with a minimum E-TFCI on the secondary stream, combination with E-TFCI lower than the minimum configured E-TFCI value on the secondary stream may not be considered by the WTRU and be considered blocked. Assuming two E-DPCCHs (similar concepts also apply to the case where a single E-DPCCH is configured), the NRPM for the combination of E-TFCI$_i$ and E-TFCI$_j$ may be calculated by equation (2):

$$NRPM_{i,j}(PMax_{i,j}-P_{DPCCH1,target}-P_{DPCCH2}-P_{DPDCH}-P_{HS-DPCCH}-P_{E-DPCCH,i}-P_{E-DPCCH,j})/P_{DPCCHi,target}, \quad (2)$$

where in addition to the terms defined above:

$PMax_{i,j}$ is the maximum power available for transmission, accounting for possible maximum power reduction for dual-stream transmission of the combination of E-TFC$_j$ and E-TFC$_i$;

$P_{E-DPCCH\ i}$ is the power of the E-DPCCH for E-TFC$_i$ (that is, E-DPCCH power boosting is taken into account).

Assuming a single E-DPCCH, the NRPM for the combination of E-TFCI$_i$ and E-TFCI$_j$ may be calculated as follows:

$$NRPM_{i,j}(PMax_{i,j}-P_{DPCCH1,target}-P_{DPCCH2}-P_{DPDCH}-P_{HS-DPCCH}-P_{E-DPCCH,i,j})/P_{DPCCHi,target}, \quad (2)$$

where in addition to the terms defined above:

$P_{E-DPCCH\ i,j}$ is the power of the E-DPCCH for the combined E-TFC$_j$ and E-TFC$_i$ (that is, E-DPCCH power boosting is taken into account).

While the $NRPM_{i,j}$, $PMax_{i,j}$, and $P_{E-DPCCH,i,j}$ notation makes reference to two separate E-TFCs, it is more convenient for presentation purposes, and without loss of generality, to consider combinations as single entity and refer to the NRPM for each combination k as $NRPM_k$. In such cases, the NRPM calculation for E-TFC combination k may be expressed as follows:

$$NRPM_k = (PMax_k - P_{DPCCH1,target} - P_{DPCCH2} - P_{DPDCH} - P_{HS-DPCCH} - P_{E-DPCCH,k})/P_{DPCCH,i,target}, \quad (3)$$

where in addition to the terms defined above:

$PMax_k$ is the maximum power available for transmission, accounting for possible maximum power reduction for dual-stream transmission for the $k^{th}$ combination of E-TFC; and $P_{E-DPCCH\ k}$: power of the E-DPCCH for the $k^{th}$ combination of E-TFC (that is, the total E-DPCCH power, including potential boosting is taken into account).

It is noted that in calculating the NRPM for two streams operation, the value of the second DPCCH power may be different than the value used for calculating the NRPM for single stream operations. This may allow, for instance, a reduction in transmission power when a single stream is transmitted and thus when the second DPCCH is only used by the NodeB for determining the best pre-coding weights.

It should also be understood that the WTRU does not account for the power of channels that are not transmitted (for example if no DPDCH is configured, $P_{DPDCH}$ should be 0 in the calculation of the NRPM). In calculating the NRPM for an E-TFC combination, it should be understood that the WTRU estimates the power for the E-TFC combination taking into account all the required channels and power boosting, if applicable.

If the current transmission is rank-one transmission, after obtaining $P_{DPCCHi,\ target}$, before being applied to calculate NPRM and powers of other physical channels $P_{DPCCHi,\ target}$ may be scaled by a factor which may be signaled from higher layer or derived from DL layer 1 signaling; similarly, the E-DPCCH power is evaluated based on the gain factor Δedpcch targeted for rank-2 transmission and scaled $P_{DPCCHi,\ target}$.

It may be determined for each E-TFC combination whether the combination is supported or not. This can be achieved for example by comparing the NRPM calculated in the previous step to the required relative power for the particular combination of E-TFC under consideration. In the case that the target E-DCH TTI for which E-TFC restriction is being considered does not belong to a compressed mode frame then if $$NRPM_{i,j} \geq \Sigma(\beta_{ed,j}/\beta_c)^2 + \Sigma(\beta_{ed,i}/\beta_c)^2, \quad (4)$$

then the combination of E-TFCj and E-TFCi can be supported, otherwise it cannot be supported, and where $\beta_{ec,i}/\beta_c$ is the quantized amplitude ratio for the second stream (additional details regarding techniques for calculating this quantity are found below).

To reduce the complexity of the NRPM calculation and E-TFC restriction procedure when dual stream transmission is configured, the number of possible E-TFC combinations may be reduced. This may be achieved, for example, by imposing restrictions on the transport format combinations. In one example of reduced E-TFC combination set, the set of primary stream E-TFC is limited to the E-TFC for which a transport format of $2SF_2 + 2SF_4$ is required. The set of secondary stream E-TFC may be further limited with a minimum and optionally a maximum value, which may be configured for example via RRC signaling. In another example, within each E-TFC combination, the ratio of two TBS indicated by first stream E-TFCI and secondary stream E-TFCI should be within a certain range.

In another example, the E-TFC combinations for rank-2 or dual-stream transmission are such that the primary stream TBS and/or transport format is fixed to a maximum value for all rank-2 E-TFC combinations. The WTRU may be further configured such that the rank-2 E-TFC combinations are limited to have a preconfigured transport format and/or modulation (e.g. $2SF_2 + 2SF_4$ and 16QAM or 64QAM). Table 1 shows an example E-TFC combination table where for dual-stream transmission, a maximum TBS is used for the primary stream; note that this maximum TBS value for the primary stream may be smaller than the maximum allowed value for the primary stream. This relaxation may allow for some inter-stream interference. In one particular example configuration, the sum of the TBS for both stream is always non-decreasing with respect to E-TFCI combination index. The maximum values may be configured by RRC signaling or fixed in the specifications. The E-TFCI combination for which the secondary stream TBS is non-zero are said to support dual-stream (or rank-2) transmission. The single-stream entries may be configured from a different table, or from an existing E-TFC table.

TABLE 1

| E-TFCI combination index | Primary stream TBS | Secondary stream TBS | Note |
|---|---|---|---|
| 0 | 18 | 0 | |
| 1 | 120 | 0 | |
| 2 | 125 | 0 | |
| ... | ... | ... | |
| 100 | 22995 | 0 | Highest single-stream E-TFC |
| 101 | 22995 | 2000 | Smallest dual-stream E-TFC |
| 102 | 22995 | 3000 | |
| ... | ... | ... | |
| 127 | 22995 | 22995 | Highest dual-stream E-TFC |

In another example, the WTRU is configured with one or more E-TFC tables (e.g. one for the primary stream, another one for the secondary stream). The E-TFCI combination index indicates the primary stream and secondary stream E-TFCIs in a pre-configured table. The values in the table may be configured by RRC signaling. In one example, the WTRU is configured with a set of parameters that define the values in the E-TFCI combination table. Table 2 shows an example of E-TFCI combination index table, which is parameterized by a few configurable values.

TABLE 2

| E-TFCI combination index | Primary stream E-TFCI | Secondary stream E-TFCI | Note |
|---|---|---|---|
| 0 | 0 | N/A | |
| 1 | 1 | N/A | |
| 2 | 2 | N/A | |
| ... | ... | ... | |
| $PS\_E\text{-}TFCI_{max}$ | $PS\_E\text{-}TFCI_{max}$ | N/A | Highest single-stream E-TFC |
| $PS\_E\text{-}TFCI_{max} + 1$ | $PS\_E\text{-}TFCI_{DS}$ | $SS\_E\text{-}TFCI_{DS}$ | Smallest dual-stream E-TFC |
| $PS\_E\text{-}TFCI_{max} + 2$ | $PS\_E\text{-}TFCI_{DS}$ | $SS\_E\text{-}TFCI_{DS} + 1$ | |
| ... | ... | ... | |
| $MAX\_E\text{-}TFCI$ | $PS\_E\text{-}TFCI_{DS}$ | $SS\_E\text{-}TFCI_{DS} + (MAX\_E\text{-}TFCI - PS\_E\text{-}TFCI_{max} - 1)$ | Highest dual-stream E-TFC |

Where the following parameters are defined:

$PS\_E\text{-}TFCI_{max}$: The primary stream maximum E-TFCI value.

$PS\_E\text{-}TFCI_{DS}$: The primary stream E-TFCI value for dual-stream transmission.

SS_E-TFCI$_{DS}$: The E-TFCI corresponding to the smallest TB for the secondary stream.

MAX_E-TFCI: The maximum allowed E-TFCI combination index (e.g. 127 for 7 bit signaling). This value is fixed in the specification.

With this approach, the table may be parameterized by only three parameters. In one example, PS_E-TFCI$_{max}$=PS_E-TFCI$_{DS}$ and thus the WTRU may be configured with only two parameters to populate the E-TFCI combination table. The WTRU is configured to use the E-TFCI combination table for both E-TFC restriction and E-TFC selection purposes. The WTRU may only apply dual-stream transmission when at least one E-TFCI combination supporting dual-stream or rank-2 transmission is supported for the next transmission.

The E-TFC restriction procedure may report which set of E-TFC are supported for 1 and 2 streams or which E-TFC combination is supported to the E-TFC selection procedure. The E-TFC restriction procedure may also report the number of maximum number of bits supported for the next TTI, potentially independently for each stream. In the case of dual stream transmission, the E-TFC restriction procedure may report the aggregated number of bits supported in the TTI under consideration, by summing the TBS associated to each supported E-TFC combination. This may be used as maximum supported payload.

Due to the non-linear nature of the required transmission power with respect to the total number of bits to transmit in particular in the presence of high-order modulation (e.g. 16QAM or 64QAM), there may be cases where for the same total number of bits it may be more power-efficient for the WTRU to use single-stream transmission than MIMO and likewise, there may also be cases where for the same total number of bits it may be more power-efficient for the WTRU to use single-stream over dual-stream. In such cases, the WTRU may discard the E-TFC or E-TFC combinations that are less power-efficient. More specifically, in cases where the E-TFC restriction procedure indicates that a given supported dual-stream E-TFC combination providing similar aggregate number of bits than a supported single-stream E-TFC, the WTRU may discard the E-TFC or the E-TFC combination requiring the largest amount of power for transmission. The WTRU may determine that two E-TFC combination provide similar aggregated number of bits when the number of bits are equal, or the difference between the two E-TFC combination is small, for example below a configured threshold.

2.2.1.2 Single Transport Block

To support this configuration, there may be a new E-TFC set for rank-2 transmission; i.e., the new E-TFC set may be a subset of the E-TFC set for rank-1 transmission, or on top of the E-TFC set for rank-1 transmission, additional E-TFCs are included to accommodate higher transport block size. This may help to significantly reduce the complexity of the NRPM calculation and E-TFC restriction procedure when dual stream transmission is configured as the size of the new E-TFC set for rank-2 transmission is comparable with that for rank-1 transmission. As an example procedure for this technique, the WRTU may first calculate the NRPM for E-TFC candidate j as NRPM$_j$=(PMax$_j$−P$_{DPDCH}$−P$_{DPCCH1,target}$−P$_{DPCCH2}$−P$_{HS\text{-}DPCCH}$−P$_{E\text{-}DPCCH,j}$)/P$_{DPCCH1,target}$.

If NRPM$_j$≥Σ(β$_{ed,j}$/β$_c$)$^2$ then E-TFC$_j$ can be supported; otherwise it cannot be supported.

With this example technique, the WRTU may calculate two sets of supported E-TFCs. One set of supported E-TFC corresponds to rank-1 transmissions and the second set to rank-2 transmissions. The two sets may be derived using the same or different E-TFC tables, and in particular the E-TFC table for rank-2 transmission may contain larger E-TFC values than the E-TFC table for rank-1 transmission. Further, the WRTU may be configured with two sets of reference power offset tables (power offset, E-TFCI pairs): one for single stream (rank-1) and another set for dual stream (rank-2) transmission. The two tables may have common E-TFCI values. Optionally, an additional power offset for rank-2 transmission may be configured. This additional power offset is applied on top of the existing reference power offsets by the WRTU for calculating the resulting power to use for rank-2 transmissions.

In the case where the same E-TFC is supported for rank-1 and rank-2 transmissions, the WRTU may have to decide which transmission mode to use. In such cases, the WRTU may also associate to each supported E-TFC a measure of efficiency. The WRTU then uses the transmission mode (rank-1 or rank-2) that is the most efficient for the given E-TFC. This may be achieved, for example, by calculating for each E-TFC from both rank-1 and rank-2 sets the total power offset required for the E-TFC under considerations, for example, the WRTU calculates Σ(β$_{ed,j}$/β$_c$)$^2$ for each E-TFC that is common to both rank-1 and rank-2 transmissions, and then determines for each E-TFC which of the two transmission mode requires the least amount of energy (in this example corresponding to the transmission mode with the lower Σ(β$_{ed,j}$/β$_c$)$^2$ value). Note that this calculation may be carried out by the WRTU for each E-TFC that may be carried using both transmission modes once upon reception of the power offset table configurations, for one or more HARQ offset, or alternatively every TTI for one or more HARQ offset.

2.2.2 Separately (on a Per Stream Basis)

In various embodiments, the set of supported E-TFCs may be calculated independently for each stream. At a high level, a WRTU may determine how to split the power between the two streams and then calculates the set of supported/blocked E-TFCs for each stream independently. Optionally, the E-TFC selection, transport format selection and channel coding may also be performed independently potentially using the conventional procedures.

2.2.2.1 Power Split Based on Serving Grant

In this example method, a WRTU may calculate the set of supported E-TFCIs for each stream independently, assuming two independent serving grants, one for each stream. Due to the two streams share a single maximum WRTU transmission power, before applying E-TFC selection and restriction, a power pre-allocation procedure between the two carriers may first be performed. Then, the E-TFC restriction procedure may follow on each stream based on the pre-allocated powers for each stream. Due to the similarity in scheduling to dual carrier (DC) HSUPA, the DC-HSUPA E-TFC restriction procedure may be reused. Example steps follow.

In step one, power pre-allocation procedure: In order to decide how much power is allocated to each stream for transmissions, the WRTU pre-allocates power for non-scheduled transmissions, P$_{non\text{-}SG}$, on the primary stream. The maximum remaining power allowed for scheduled E-DCH transmission on two streams may be determined by equation (6):

$$P_{remaining,s}=\max(PMax-P_{DPCCH1,target}-P_{DPCCH2,target}-P_{HS\text{-}DPCCH}-P_{non\text{-}SG},0) \quad (5)$$

where P$_{non\text{-}SG}$ is P the power required for the WRTU to transmit the available non-scheduled data up to available non-scheduled grant; $P_{DPCCH1,target}$, and $P_{DPCCH2,target}$ represents the estimate of the current WRTU DPCCH powers.

When there are two new transmissions or two retransmissions, one on each stream in the same TTI, the maximum remaining power allowed for E-DCH transmission on each stream may be calculated in the following two example steps. The power allocated to stream i, $P_i$ may be computed according to equation (7).

$$P_i = P_{remaining,s} \frac{P_{DPCCH,target,i} SG_i}{\sum_k P_{DPCCH,target,k} SG_k} \qquad (6)$$

where $SG_i$ is the serving grant for stream i.

For the primary stream, the maximum remaining power allowed for E-DCH transmission is the sum of the power $P_{non-SG}$ and the power $P_i$ allocated to the primary stream. For the secondary stream, the maximum remaining power allowed for E-DCH transmission is the power $P_i$ for this stream. That is:

$$P_{allocated,1} = P_1 + P_{non-SG}$$

$$P_{allocated,2} = P_2$$

When there is one new transmission on one stream and one retransmission on the other stream in the same TTI, the power allocated to the stream for which a retransmission is required $P_{allocated,x}$ and the power allocated to the stream for which no retransmission is required $P_{allocated,y}$ are given by the following equations:

$$P_{allocated,y} = PMax - P_{HS-DPCCH} - P_{DPCCHi,target} - P_{E-DPCCH,x} - P_{E-DPDCH,x}$$

$$P_{allocated,x} = P_{E-DPCCH,x} - P_{E-DPDCH,x}$$

In step two, the estimated NRPM available for E-TFC selection for stream i based on the following equation for E-TFC candidate j:

$$NRPM_{i,j} = (P_{allocated,i} - P_{E-DPCCH,j,i})/P_{DPCCHi,target}$$

where $P_{E-DPCCH,j,i}$ represents the estimated E-DPCCH transmit power for $E-TFCI_j$ on stream i.

In step 3, for each stream, it may be determined for each E-TFC whether it is supported or not using a conventional approach.

In one embodiment, for dual stream transmission the power for non-scheduled transmission is not pre-allocated for the first stream only. In such method non-scheduled data may be transmitted in any of the stream and therefore power pre-allocation for non-scheduled data may not be necessary. In such method the remaining power may be determined according to the following:

$$P_{remaining,s} = \max(PMax - P_{DPCCH1,target}, - P_{DPCCH2,target} - P_{HS-DPCCH}, 0)$$

After splitting the power according the grant ratio as described above, then for the primary stream, the maximum remaining power allowed for E-DCH transmission corresponds to the power $P_i$ allocated to the primary stream. For the secondary stream, the maximum remaining power allowed for E-DCH transmission is the power $P_i$ for this stream. That is:

$$P_{allocated,1} = P_1$$

$$P_{allocated,2} = P_2$$

Which are then used to determine $NRPM_{i,j}$ for each stream i for candidate E-TFCI j according to the following formula:

$$NRPM_{i,j} = (P_{allocated,i} - P_{E-DPCCH,j,i})/P_{DPCCHi,target}$$

or $$NRPM_{i,j} = (P_{allocated,i} - P_{E-DPCCH,j,i})/P_{DPCCH1,target}$$

In another implementation of this method, the grants between the two streams are not independent. In one example, the WRTU receives a global and dynamic serving grant. The WRTU is further configured with a grant offset that is used to derive the grant for each stream from the global grant. For example, using the notation above for simplicity, and defining the global grant as $SG_{tot}$ and the grant offset $\gamma^2$, the serving grant for stream 1 and 2 may respectively be calculated by equation (8) and equation (9):

$$SG_1 = \gamma^2 SG_{tot} \qquad (7)$$

$$SG_2 = (1-\gamma^2) SG_{tot} \qquad (8)$$

The WRTU may apply the power splitting algorithm described above using those values of $SG_1$ and $SG_2$. The WRTU may receive the grant offset $\gamma^2$ value via RRC signaling, or alternatively via another downlink signal (e.g. E-AGCH with a special E-RNTI value configured or similar channel). Alternatively, the value of the grant offset may be fixed in the specifications.

2.2.2.2 Power Split Based on PMax Split

In this example method, the WRTU calculates the set of supported E-TFCIs for each stream independently, based on the power splitting of PMax. The NRPM for stream i=1,2 may be expressed equation (10):

$$NRPM_{i,j} = (PMax_{i,j} - P_{DPCCH,i,target} - P_{DPDCH,i} - P_{HS-DPCCH,i} - P_{E-DPCCH,i,j})/P_{DPCCH,i,target}, \qquad (9)$$

where, $NRPM_{i,j}$ is the normalized remaining power for stream i and E-TFCI j;

$PMax_{i,j}$ is the maximum power allowed for stream i, potentially taking into account maximum power reduction (MPR) for E-TFC j.

$P_{DPCCH,i,target}$ is the estimated DPCCH power target for stream i $P_{DPDCH,i}$ is the power of the DPDCH for stream i (optionally null for the second stream)

$P_{HS-DPCCH,i}$ is the power of the HS-DPCCH for stream i (optionally null for the second stream)

$P_{E-DPCCH,i,j}$ is the power of the E-DPCCH for stream i and E-TFCI j (optionally null for the second stream).

Once the NRPM for each stream is calculated, the WRTU may calculate the set of supported and blocked E-TFCs using the conventional approach whereby the NRPM is compared to the required normalized power for each E-TFC to determined whether or not it is supported, e.g. E-TFCIj on stream i is supported if the following relation holds:

$$NRPM_{i,j} \geq \Sigma(\beta_{ed,j}/\beta_c)^2, \qquad (11)$$

otherwise it is blocked.

To determine the maximum power for each stream, the WRTU may use one or more of the following two approaches, individually or in any combination.

In a first approach, the WRTU receives an explicit signal from the NodeB that indicates the power split between the two streams. The signal may be transmitted every TTI or less often, in which case the WRTU may use the last signaled value when performing E-TFC restriction. For example, this signal may consist of an index to a lookup table indicating the relative power between the two streams or similarly between $PMax_1$ and $PMax_2$, where $PMax_i$ (i=1,2) indicates the maximum allowed power for stream i not necessarily taking MPR into account. By using the total maximum allowed by the Maximum WRTU transmitter power (PMax here) (which may be either signaled via RRC signaling or obtained from the WRTU power class) and this power ratio $$\Gamma = PMax_2/PMax_1 \quad (12)$$

obtained from the signaled index and power ratio table, the WRTU may calculate $PMax_i$ for i=1,2 for example as follows:

$$PMax_1 = PMax/(1+\Gamma) \quad (13)$$

$$PMax_2 = PMax/(1+1/\Gamma) \quad (14)$$

Alternatively, and to avoid under allocating power that would be necessary for the control channels, the WRTU may pre-allocate power for the control channels first, and then apply the power splitting. This can be achieved as follows (assuming for example that power is pre-allocated on both streams): the WRTU pre-allocate the required power for control channels to stream 1 and calculates the reduced PMax as follows:

$$PMax_{reduced} = PMax - P_{pre,1} - P_{pre,2} \quad (15)$$

where $P_{pre,i}$ is the power pre-allocated for stream i, i=1,2. Then the power is split according to and $PMax_1$ and $PMax_2$ may be obtained as follows:

$$PMax_1 = PMax_{reduced}/(1+\Gamma) + P_{pre,1} \quad (16)$$

$$PMax_2 = PMax_{reduced}/(1+1/\Gamma) + P_{pre,2} \quad (17)$$

The pre-allocated power for the first stream may include the power necessary to transmit the DPCCH, the HS-DPCCH, the E-DPCCH and potentially also the DPDCH. Similarly, the pre-allocated power for the second stream may include the power necessary to transmit the second DPCCH, and optionally the second E-DPCCH.

In another method $PMax_{reduced}$ may be determined according to:

$$P_{Maxreduced} = \max(PMax - P_{DPCCH1,target}, - P_{DPCCH2,target}, P_{HS-DPCCH}, 0)$$

The UE may then determine the Pmax,allocated, i (i=1.2) for each stream:

$$PMax,allocated_1 = PMax_{reduced}/(1+\Gamma)$$

$$PMax,allocated_2 = PMax_{reduced}/(1+1/\Gamma)$$

Once Pmax,allocated,i is determined the UE may perform the NRPM calculation for each stream I based on the following equation for E-TFC candidate j:

$$NRPM_{i,j} = (PMax_{allocated,i} - P_{E-DPCCH,i,j})/P_{DPCCHi,target}$$

In alternate embodiment, only the PDCCH1,target may be used for the NRPM calculation for both streams. This may be applicable to other embodiments described above. One example of NRPM calculation is shown below:

$$NRPM_{i,j} = (PMax_{allocated,i} - P_{E-DPCCH,i,j})/P_{DPCCH1,target}$$

The WRTU may determine the value of $\Gamma$ for example from a table associating the signaled index to the actual power ratio. Table 3 shows an example lookup table for power ratio between $PMax_2$ and $PMax_1$ where example values of $\Gamma$ in dB are shown.

TABLE 3

| Index signaled | $10 * \log10(\Gamma)$, where $\Gamma = PMax_2/PMax_1$ |
|---|---|
| 0 | 0 |
| 1 | −1 |
| 2 | −2 |
| 3 | −3 |
| 4 | −4 |
| 5 | −5 |
| 6 | −6 |
| 7 | −infinity |

In a second approach to determine the maximum power for each stream, the WRTU may calculate the power split between $PMax_2$ and $PMax_1$ based on instantaneous DPCCH power ratio. For instance, when using two power control loops, the WRTU may calculate the ratio between $PMax_2$ and $PMax_1$ ($\Gamma$) as in equation (19):

$$\Gamma = P_{DPCCH2,target}/P_{DPCCH1,target}, \quad (18)$$

such that more power is allocated to the stream with the best ratio conditions.

In a third approach to the determine the maximum power for each stream the WRTU may calculate the power split based on a configured or predefined split factor $\gamma$. The maximum power for each stream may be determined according to the power split factor as:

$$Pmax1 = \gamma Pmax$$

$$Pmax2 = (1-\gamma)Pmax$$

The Pmax,i may then be used as an input to the NRPM formula as described above to determine the NRPM for each stream i for each candidate E-TFCIj ($NRPM_{i,j}$). As part of this approach the max power split may alternatively be performed after power is allocated for control channels according to:

$$PMax_{reduced} = PMax - P_{pre,1} - P_{pre,2}$$

where $P_{pre,i}$ is the power pre-allocated for stream i, i=1,2. Then the power is split according to $\Gamma$ and $PMax_1$ and $PMax_2$ may be obtained as follows:

$$PMax_1 = \gamma PMax_{reduced} + P_{pre,1}$$

$$PMax_2 = (1-\gamma)PMax_{reduced} + P_{pre,2}$$

The pre-allocated power for the first stream may include the power necessary to transmit the DPCCH, the HS-DPCCH, the E-DPCCH and potentially also the DPDCH. Similarly, the pre-allocated power for the second stream may include the power necessary to transmit the second DPCCH, and optionally the second E-DPCCH.

In another method $PMax_{reduced}$ may be determined according to:

$$P_{Maxreduced} = \max(PMax - P_{DPCCH1,target}, - P_{DPCCH2,target}, P_{HS-DPCCH}, 0)$$

The UE may then determine the Pmax,allocated, i (i=1.2) for each stream:

$$PMax,allocated_1 = \gamma PMax_{reduced}$$

$$PMax,allocated_2 = (1-\gamma)PMax_{reduced}$$

Once Pmax,allocated,i is determined the UE may perform the NRPM calculation for each stream I based on the following equation for E-TFC candidate j:

$$NRPM_{i,j} = (PMax_{allocated,i} - P_{E-DPCCH,i,j})/P_{DPCCHi,target}$$

or $$NRPM_{i,j} = (P_{allocated,i} - P_{E-DPCCH,i,j})/P_{DPCCH1,target}$$

Based on each NRPM the UE may then determine the set of supported E-TFCI for each stream.

2.2.3 Split at the NRPM Level Based on Primary Stream E-TFC

In this example method, the WRTU may calculate the set of supported E-TFCIs for the primary stream based on a splitting of the total NRPM. The WRTU is configured with a NRPM split factor $\gamma_{NRPM}$; in this context the fraction of NRPM allocated for the primary stream is $\gamma_{NRPM}$ and the fraction of NRPM allocated for the second stream is $(1-\gamma_{NRPM})$.

For simplification of description, it is assumed here that $\gamma_{NRPM}=0.5$ such that half the NRPM is allocated in this case to each stream. Further, it is assumed for simplicity of presentation that there is no DPDCH or HS-DPCCH on the secondary stream, and that the S-DPCCH is not independently power controlled.

Further, assuming that the power of the E-DPCCH on each stream and the PMax backoff are determined by the E-TFC used on the primary stream (and optionally the fact that there is a dual-stream transmission), the total NRPM may be expressed as equation (19):

$$NRPM_{tot,j} = (PMax_j - P_{DPCCH,target} - P_{S-DPCCH,target} - P_{DPDCH} - P_{HS-DPCCH} - P_{E-DPCCH,j} - P_{S-E-DPCCH,j})/P_{DPCCH,target}, \quad (19)$$

Where:

$NRPM_{tot,j}$ is the total normalized remaining power for and E-TFCI j on the primary stream;

$PMax_j$ is the maximum power allowed, potentially taking into account maximum power reduction (MPR) for E-TFC j on the primary stream;

$P_{DPCCH,target}$ is the estimated DPCCH power target;

$P_{S-DPCCH, target}$ is the estimated S-DPCCH power target (may be based on an offset with respect to DPCCH power target, and may also include some power boosting possibly dependent on the E-TFC/combination of E-TFCs—in which case it may also depend on index j);

$P_{DPDCH}$ is the power of the DPDCH;

$P_{HS-DPCCH}$ is the power of the HS-DPCCH;

$P_{E-DPCCH,j}$ is the power of the E-DPCCH for E-TFCI j on the primary stream; and $P_{S-E-DPCCH,j}$ is the power of the secondary stream E-DPCCH (S-DPCCH) for E-TFCI j on the primary stream. It is understood that this term may be null for the purpose of calculating an NRPM on a primary stream assuming no transmissions on the secondary stream.

The WRTU may calculate the NRPM for the primary stream for each E-TFC j in accordance with equation (20):

$$NRPM_{1,j} = \gamma_{NRPM} \times NRPM_{tot,j} \quad (20)$$

The WRTU then determines the state of each E-TFC for the primary stream using the conventional means that is E-TFC j is supported if the following relation holds:

$$NRPM_{1,j} \geq \Sigma(\beta_{ed,j}/\beta_c)^2, \quad (21)$$

otherwise it is blocked.

Optionally, the WRTU may also calculate the state of each E-TFC for the secondary stream. In one approach, the WRTU calculates the state of each E-TFC for the secondary stream using the remaining fraction of the NRPM for the secondary stream. The WRTU first calculates the NRPM for the secondary stream:

$$NRPM_{2,j} = (1-\gamma_{NRPM}) \times NRPM_{tot,j} \quad (22)$$

the WRTU then determines the state of each E-TFC for the secondary stream using the conventional means potentially using an adjusted gain factors ($\beta'_{ed,j}$); that is E-TFC j is supported if the following relation holds:

$$NRPM_{2,j} \geq \Sigma(\beta'_{ed,j}/\beta_c)^2, \quad (23)$$

otherwise it is blocked. The adjusted gain factor ($\beta'_{ed,j}$) may be derived from the conventional reference gain factors and an offset derived from a NodeB indication of secondary stream quality (for example signaled on a separate E-AGCH or similar channel). Methods to calculate the adjusted gain factor for the secondary stream are described in more detail below.

Note that the ($\beta'_{ed,j}$) is also applicable to other embodiment above wherein the WTRU determines the NRPM and set of supported E-TFCIs on the second stream.

2.2.3.1 Example Retransmission Case (on the Primary Stream)

In the case where there is a HARQ retransmission on the primary stream, the WRTU may be configured to determine the set of supported and blocked E-TFCs for the secondary stream. Under the restriction that the power of the secondary E-DPDCH is the same as the power of the primary E-DPDCH, the E-TFC restriction procedure in that specific case needs to ensure that sufficient power is available to transmit the secondary E-DPDCH with the same power as the primary E-DPDCH. Then the restriction procedure may determine the supported E-TFCs based on the NRPM, the HARQ offset and the secondary stream quality difference (i.e. ΔMIMO defined in Section 3.1).

Let the power of the retransmitting E-DPDCH and associated E-DPCCH be denoted as $P_{E-DPDCH}$ and $P_{E-DPCCH}$, respectively. The WRTU determines if it has sufficient power to transmit a second stream (at the same power than the primary stream), for example by calculating the remaining power available for the secondary stream (with the appropriate backoff on the PMax assuming dual-stream transmission and taking into account all control channels with potential boosting) using equation (24):

$$P_{rem-secondary} = PMax - P_{DPCCH,target} - P_{S-DPCCH,target} - P_{DPDCH} - P_{HS-DPCCH} - P_{E-DPDCH} - P_{E-DPCCH} - P_{S-E-DPCCH} \quad (24)$$

If $P_{rem-secondary} \geq P_{S-E-DPDCH}$, where the power of the secondary stream $P_{S-E-DPDCH} = P_{E-DPDCH}$, then the WRTU has sufficient power to transmit the secondary E-DPDCH, otherwise there is no sufficient power and the WRTU does not transmit with dual stream. $P_{E-DPCCH}$ is the power of the E-DPCCH in the stream in which the retransmission is taking place. $P_{S-E-DPCCH}$ may correspond to the power of S-E-DPCCH for a candidate E-TFCI that could be transmitted with the corresponding $P_{S-E-DPDCH}$.

In another example, the WRTU may also calculate the NRPM for the secondary stream by equation (25):

$$NRPM_2 = (PMax - P_{DPCCH,target} - P_{S-DPCCH,target} - P_{DPDCH} - P_{HS-DPCCH} - P_{E-DPDCH} - P_{E-DPCCH} - P_{S-E-DPCCH})/P_{DPCCH,target}, \quad (25)$$

where it is also assumed here that PMax is accounting for potential backoff and the control channels are also accounting for potential boosting associated to dual-stream transmission. For simplicity in this example the backoff and boosting is independent of the candidate E-TFC but the concept could also apply to that case. The WRTU then determines whether or not it can transmit with a second stream If $NRPM_2 \geq P_{E-DPDCH}/P_{DPCCH,target}$ then the WRTU has sufficient power to transmit the secondary E-DPDCH, otherwise there is no sufficient power and the WRTU does not transmit with dual streams.

If the WRTU has sufficient power to transmit with dual streams, then the WRTU may calculate the set of supported E-TFCs for the second stream. This may be achieved by using the normalized power of the primary stream as a reference point to which the required power offset for each candidate E-TFC is compared to. More specifically, for each E-TFC candidate j, if $$P_{E\text{-}DPDCH}/P_{DPCCH,target} \geq \Sigma(\beta'_{ed,j}/\beta_c)^2, \quad (26)$$

the E-TFCj on the secondary stream is supported, otherwise it is blocked. The adjusted gain factor ($\beta'_{ed,j}$) may be derived from the conventional reference gain factors and potentially an offset derived from a NodeB indication of secondary stream quality (for example signaled on a separate E-AGCH or similar channel). Example methods to calculate the adjusted gain factor for the secondary stream are described in more detail below.

In an alternate example, this may be performed by calculating an NRPM for the secondary stream for each candidate E-TFCI$_j$:

$$NRPM_{2,j} = (PMax - P_{DPCCH,target} - P_{S\text{-}DPCCH,target} - P_{DPDCH} - P_{HS\text{-}DPCCH} - P_{E\text{-}DPDCH} - P_{E\text{-}DPCCH} - P_{S\text{-}E\text{-}DPCCH,j})/P_{DPCCH,target}$$

Then for each E-TFC candidate j, if $NRPM_{2,j} \geq \Sigma(\beta'_{ed,j}/\beta_c)^2$ the E-TFCj on the secondary stream is supported, otherwise it is blocked. If no supported E-TFCIs are found the UE transmits single stream retransmission only.

2.2.3.2 Example Retransmission Case (on Secondary Stream)

In a first option for the case where there is a HARQ retransmission on the secondary stream, the WRTU may be configured to carry out the retransmission on the primary stream. Then the retransmission case on the secondary stream becomes effectively the retransmission case for the primary stream and the methods for calculating the set of supported E-TFCs for the secondary stream in the case of a primary stream HARQ retransmission described above may be used.

In an alternative option, the retransmission takes place on the secondary stream and E-TFC restriction is carried out for calculating the set of supported E-TFCs for the primary stream. Under the context of equal power between the E-DPDCH on each stream, the WRTU applies a similar approach as what is described above, but this time with the secondary stream retransmitting.

The WRTU may determine if it has sufficient power to transmit a second stream (at the same power than the retransmitting secondary stream). This may be achieved for example by calculating the remaining power available for the primary stream (with the appropriate backoff on the PMax assuming dual-stream transmission and taking into account all control channels with potential boosting):

$$P_{rem\text{-}primary} = PMax - P_{DPCCH,target} - P_{S\text{-}DPCCH,target} - P_{DPDCH} - P_{HS\text{-}DPCCH} - P_{S\text{-}E\text{-}DPDCH} - P_{E\text{-}DPCCH} - P_{S\text{-}E\text{-}DPCCH} \quad (27)$$

If $P_{rem\text{-}primary} \geq P_{E\text{-}DPDCH}$, where the power of the secondary stream $P_{E\text{-}DPDCH} = P_{S\text{-}E\text{-}DPDCH}$, then the WRTU has sufficient power to transmit the primary E-DPDCH, otherwise there is no sufficient power and the WRTU does not transmit with dual stream.

In another example, the WRTU may also calculate the NRPM for the primary stream as follows:

$$NRPM_1 = (PMax - P_{DPCCH,target} - P_{S\text{-}DPCCH,target} - P_{DPDCH} - P_{HS\text{-}DPCCH} - P_{S\text{-}E\text{-}DPDCH} - P_{E\text{-}DPCCH} - P_{S\text{-}E\text{-}DPCCH})/P_{DPCCH,target}, \quad (28)$$

where it is also assumed here that PMax is accounting for potential backoff and the control channels are also accounting for potential boosting associated to dual-stream transmission. For simplicity in this example the backoff and boosting is independent of the candidate E-TFC but the concept could also apply to that case. The WRTU then determines whether or not it can transmit with a second stream.

If $NRPM_1 \geq P_{S\text{-}E\text{-}DPDCH}/P_{DPCCH,target}$ then the WRTU has sufficient power to transmit the primary E-DPDCH at the same power as the secondary stream E-DPDCH, otherwise there is no sufficient power and the WRTU does not transmit with dual streams.

Alternatively, $NRPM_{1,j}$ is determined:

$$NRPM_{1,j} = (PMax - P_{DPCCH,target} - P_{S\text{-}DPCCH,target} - P_{DPDCH} - P_{HS\text{-}DPCCH} - P_{SE\text{-}DPDCH} - P_{S\text{-}E\text{-}DPCCH} - P_{E\text{-}DPCCH,j})/P_{DPCCH,target}.$$

Then the UE determines the supported E-TFCIs in combination with the E-TFCI to be retransmitted in the second stream (e.g. if $NRPM_{1,j} \geq \Sigma(\beta_{ed,j}/\beta_c)^2$ the E-TFCj on the primary stream is supported, otherwise it is blocked). If no supported E-TFCIs are found then the UE determines that it doesn't have enough power to transmit on both streams.

If the WRTU has not enough power to transmit with dual stream, it may in one option carry out the retransmission on the secondary stream. In an alternate option, the WRTU may carry out the retransmission on the primary stream (effectively changing the HARQ stream association).

If the WRTU has sufficient power to transmit with dual streams, then the WRTU may calculate the set of supported E-TFCs for the primary stream. This may be achieved by using the normalized power of the secondary stream as a reference point to which the required power offset for each candidate E-TFC is compared to. More specifically, for each E-TFC candidate j, if $$P_{S\text{-}E\text{-}DPDCH}/P_{DPCCH,target} \geq \Sigma(\beta_{ed,j}/\beta_c)^2, \quad (29)$$

the E-TFC j on the secondary stream is supported, otherwise it is blocked. The gain factor ($\beta_{ed,j}$) may be calculate using the conventional methods.

3. Example Methods for Calculating the Gain Factor for the Second Stream 3.1 Example Methods Based on Stream Equal Power Here it is assumed that the E-DPDCH on both streams are transmitted using an equal amount of power. Further assuming that the DPCCH is the reference power level, this approach implies that both streams use the same gain factors (assuming the same transport format is used for both streams).

The secondary stream typically has lower quality than the primary stream, as it is transmitted over a weaker eigen mode of the channel. To adjust for the difference in quality, the WRTU may receive a signal from the NodeB, indicating a relative quality difference with respect to the primary stream. Let this quality difference be expressed in dB as $\Delta MIMO$ (for example, the SNR difference between the primary and secondary stream is $\beta MIMO = SNR_{primary} - SNR_{secondary}$ (dB)). Using this definition, $\Delta MIMO$ in general would be positive, with 0 dB indicating similar quality between the two streams. A large $\Delta MIMO$ indicates a weak secondary stream SNR.

3.1.1 Example Method to Calculate the Gain Factor for the Secondary Stream

When the E-DPDCH power extrapolation formula is suitably configured, the adjusted gain factor for the second stream E-TFC may be calculated as follows.

For the second stream i:th E-TFC, the temporary gain factor $\beta'_{ed,i,harq}$ is computed as:

$$\beta'_{ed,i,harq} = \beta_{ed,ref} \sqrt{\frac{L_{e,ref}}{L_{e,i}}} \sqrt{\frac{K_{e,i}}{K_{e,ref}}} \cdot 10^{\left(\frac{\Delta harq}{20}\right)} \cdot 10^{\left(\frac{\Delta MIMO}{20}\right)} \quad (30)$$

Similarly, when the E-DPDCH power interpolation formula is configured, let $\beta_{ed,ref,1}$ and $\beta_{ed,ref,2}$ denote the reference gain factors of the primary and secondary reference E-TFCs respectively. Let $L_{e,ref,1}$ and $L_{e,ref,2}$ denote the number of E-DPDCHs used for the primary and secondary reference E-TFCs respectively. Let $L_{e,i}$ denotes the number of E-DPDCHs used for the i:th E-TFC. If SF2 is used, $L_{e,ref,1}$, $L_{e,ref,2}$ and $L_{e,i}$ are the equivalent number of physical channels assuming SF4. Let $K_{e,ref,1}$ and $K_{e,ref,2}$ denote the transport block sizes of the primary and secondary reference E-TFCs respectively. Let $K_{e,i}$ denotes the transport block size of the i:th E-TFC, where the mapping between the E-TFCI and the E-DCH transport block size as will be understood. For the i:th E-TFC, the temporary variable for the secondary stream $\beta'_{ed,i,harq}$ is computed as:

$$\beta'_{ed,i,harq} = \sqrt{\frac{L_{e,ref,1}}{L_{e,i}}} \cdot \sqrt{\left(\frac{\frac{L_{e,ref,2}}{L_{e,ref,1}}\beta^2_{ed,ref,2} - \beta^2_{ed,ref,1}}{K_{e,ref,2} - K_{e,ref,1}}\right)(K_{e,i} - K_{e,ref,1}) + \beta^2_{ed,ref,1}} \cdot 10^{\left(\frac{\Delta harq}{20}\right)} \cdot 10^{\left(\frac{\Delta MIMO}{20}\right)} \quad (31)$$

with the exception that $\beta'_{ed,i,harq}$ is set to 0 if $$\left(\frac{\frac{L_{e,ref,2}}{L_{e,ref,1}}\beta^2_{ed,ref,2} - \beta^2_{ed,ref,1}}{K_{e,ref,2} - K_{e,ref,1}}\right)(K_{e,i} - K_{e,ref,1}) + \beta^2_{ed,ref,1} \leq 0. \quad (32)$$

For both cases of E-DPDCH power extrapolation and interpolation, if ΔMIMO is set to infinity (∞), then the secondary stream may not carry data and the WRTU may not need to calculate the corresponding gain factors.

3.1.2 Example Methods to Calculate the Payload for the Secondary Stream

To obtain the number of bits or maximum payload for the secondary stream based on the power or gain factor determined for the primary stream, the WRTU may execute the following calculations. This time, the maximum number of bits that the secondary stream may carry may be calculated as follows.

The power ratio from the primary stream may be used to determine a maximum number of bits of scheduled data with a 1 bit granularity for the upcoming transmission on the secondary stream, calculated using the secondary stream power offset ΔMIMO signaled by the network and from number of bits corresponding to the reference E-TFCs (E-TFC$_{ref,m}$), and that the highest value is lower or equal to:

If E-DPDCH power extrapolation formula is configured:

$$\left\lfloor K_{e,ref,m} \cdot \frac{P_{o,stream1}}{L_{e,ref,m} \cdot A^2_{ed,m} \cdot 10^{\Delta harq/10} \cdot 10^{\Delta MIMO/10}} \right\rfloor \quad (33)$$

This maximum number of bits shall be lower than $K_{e,ref,n}$ bits, where $K_{e,ref,n}$ corresponds to any higher $n^{th}$ reference E-TFC (E-TFC$_{ref,n}$) for the second stream and shall be higher or equal to $K_{e,ref,n}$ of E-TFC$_{ref,m}$ except if m=1. Else if E-DPDCH power interpolation formula is configured:

$$\left\lfloor K_{e,ref,m} + \frac{\left(\frac{P_{o,stream1}}{10^{\Delta harq/10} \cdot 10^{\Delta MIMO/10}} - L_{e,ref,m} \cdot A^2_{ed,m}\right)(K_{e,ref,m+1} - K_{e,ref,m})}{L_{e,ref,m+1} \cdot A^2_{ed,m+1} - L_{e,ref,m} \cdot A^2_{ed,m}} \right\rfloor \quad (34)$$

This maximum number of bits shall be lower than $K_{e,ref,m+1}$ bits except if $K_{e,ref,m+1}$ corresponds to the number of bits of the highest reference E-TFC (E-TFC$_{ref,M}$) and shall be higher or equal to $K_{e,ref,m}$ of E-TFC$_{ref,m}$ except if m=1.

$K_{e,ref,m}$ and $L_{e,ref,m}$ above are given in TS 25.214 v10.3.0, "Physical Layer Procedures (FDD)." $A_{ed,m}$ denotes the quantized amplitude ratio assigned to E-TFC$_{ref,m}$ and is defined in TS 25.214 v10.0.0, "Spreading and Modulation (FDD)," which is incorporated herein by reference. $P_{o,stream1}$ is the power offset for the primary stream.

In an example method, the power offset for the primary stream, $P_{o,stream1}$ can be expressed by the resulting quantized gain factors and may be expressed as follows:

$$P_{o,stream1} = L_{e,stream1} \cdot A_{ed,stream1}^2, \quad (35)$$

where the $L_{e,stream1}$ is the number of physical channels used on the primary stream (if SF2 is used $L_{e,stream1}$ is the equivalent number of channels assuming SF4), and $A_{ed,stream1}$ is the quantized amplitude ratio used on the primary stream.

In another example method, the power offset for the primary stream may be calculated based on unquantized values.

Alternatively, instead of the using the power offset of the primary stream to determine the number of allowed bits, the WTRU may use a ratio of the serving grant allocated to the second stream. For example, one global serving grant may be maintained and split across both stream according to a splitting factor γ. In this case SG1=γSG$_{tot}$ and SG2=(1−)γSG$_{tot}$. The WTRU may then use the serving grant value allocated to the second stream to determine the number of bits allowed to be transmitted on the second stream according to the grant if power extrapolation formula is used:

$$\left\lfloor K_{e,ref,m} \cdot \frac{SG_2}{L_{e,ref,m} \cdot A^2_{ed,m} \cdot 10^{\Delta harq/10} \cdot 10^{\Delta MIMI/10}} \right\rfloor$$

Or if power interpolation formula is used $$\left\lfloor K_{e,ref,m} + \frac{\left(\frac{SG_2}{10^{\Delta harq/10} \cdot 10^{\Delta MIMO/10}} - L_{e,ref,m} \cdot A^2_{ed,m}\right)(K_{e,ref,m+1} - K_{e,ref,m})}{L_{e,ref,m+1} \cdot A^2_{ed,m+1} - L_{e,ref,m} \cdot A^2_{ed,m}} \right\rfloor$$

Where reference K and L value may correspond to the reference values for the secondary stream or that of a first stream. The number of bits for the primary stream may be determined according to SG1 and the primary stream reference values as in non-MIMO operation.

In another example method, the WTRU may calculate the number of bits on the secondary stream based on the number of bits on the primary stream and an offset signaled by the NodeB this time in terms of number of bits. For example, let $K_{e,1}$ be the number of bits calculated for the primary E-DPDCH stream, and $K_{MIMO}$ be an offset signaled by the NodeB (for instance via an index over a physical channel) then the WTRU may calculate the number of bits for the secondary E-DPDCH stream ($K_{e,2}$) as follows: $K_{e,2}=K_{e,1}-K_{MIMO}$. The WTRU may calculate the number of bits for the primary stream based on one of the approach described herein, for example.

3.1.3 Example Methods to Calculate a Threshold for Determining Rank-1 Vs Rank-2 Transmission Based on the Secondary Stream Power Offset The WTRU may be configured to determine a threshold below which it transmits using rank-1 transmission, and above which may transmit using rank-2 transmission. The WTRU may be configured to receive a secondary stream power offset, or similar indication from the NodeB, indicating the relative quality of the secondary stream with respect to the primary stream.

The WTRU may determine the HARQ offset for the next TTI, for example by determining the highest priority non-empty logical channel that may be transmitted in the next TTI. The WTRU may then calculate the primary stream E-TFCI which supports the minimum allowed transport block size on the secondary stream (E-TFCI$_{MIN,2S}$) The WTRU may then apply single stream transmission for E-TFCI below that threshold E-TFCI$_{MIN,2S}$.

More specifically, the WTRU may determine the gain factor required for supporting E-TFCI$_{MIN,2S}$. This may be carried out by using equation (30) or (31) above, where $\Delta$MIMO is the secondary stream power offset. Under the assumption that the transmission power for both E-DPDCH on the primary and secondary stream are the same, the WTRU may then determine that the corresponding gain factor for the primary stream is the same (up to some quantization) as the one calculated for the secondary stream. The WTRU then determines the E-TFCI associated to the primary stream gain factor, for instance by using the conventional equation similar to (33) and (34) but without the $\Delta$MIMO term. The WTRU may then use this E-TFCI as the E-TFCI$_{MIN,2S}$ threshold value.

As is to be appreciated, the above procedure may also be applied to embodiments where quantization of the power level and the number of bits (e.g. finite TBS values).

4. Example Methods for WRTU to Determine the Transmission Rank

In an embodiment, a NodeB may signal two grants, one for each stream to the WRTU explicitly. The grant associated to the secondary stream may control the rank. A 0 grant may indicate a rank-1 transmission. Non-zero grants may indicate rank-2 transmission.

If the Node B signals two grants on two different downlink physical channels, the WRTU may determine the transmission rank based on blind detection of the presence of both physical channels carrying grants. For example, if both physical channels carrying grants are detected by the WRTU, then WRTU determines it is rank 2 transmission. If only one such physical channel is detected, the WRTU determines it is rank 1 transmission.

Alternatively, the WRTU may be configured semi-statically with a given transmission rank. For example this could be done via HS-SCCH order or E-AGCH signaling (or similar channel). The WRTU may keep its rank configuration until a new signal is received.

The WRTU may be configured to use the rank indication (1 or 2) as a maximum rank indication; that is when the WRTU is configured with rank-2 it may also use rank-1 transmission (e.g. if it has small amount of data in its buffer). Alternatively, the WRTU may be configured to use the rank indication (1 or 2) as an absolute rank indication, that is when the WRTU is configured with rank-2, it may only use rank-2 transmission (and likewise for rank-1 transmission).

It is noted that the absolute rank control may not be appropriate in all cases, as the WRTU may possess instantaneous information that the NodeB does not, for instance the WRTU has accurate knowledge of its available resources such as power and buffer status. Thus, it can be that the WRTU decides on how many streams (rank) to transmit. For example, when allowed to transmit with rank-2 (maximum rank control).

When configured for a maximum rank-2 transmission, the WRTU may determine the actual transmission rank (or the number of stream to transmit) using one or more of the following inputs, individually or in any combinations: maximum support payload obtained after running E-TFC restriction assuming rank-1 transmission; maximum support payload obtained after running E-TFC restriction assuming rank-2 transmission (aggregated across both streams); serving grant for the primary stream transmission; serving grant for the secondary stream transmission; UPH; downlink measurements; and/or buffer information. The following describes criteria by which the WTRU may determine its rank for transmission. These criteria may be used in any order or combination.

In an example, if the maximum supported payload for rank-2 transmission (aggregated over all layers or streams) is less than the maximum supported payload for rank-1 transmission, then WRTU may decide the next transmission is rank-1 transmission.

In another example, if the SG of the primary stream is greater than the SG of the secondary stream over a certain threshold, then WRTU may decide the next transmission is rank-1 transmission.

In another example, if the total serving grant is below a threshold, then the WRTU may decide the next transmission is a rank 1 transmission.

In another example, the WRTU determines if single-stream transmission is sufficient to empty its buffer (according to the WTRU power headroom and serving grant), for example in a configured amount of time. In one particular example, this amount of time corresponds to a single TTI. If the WRTU estimates that it can empty its buffer using single-stream transmission with the current headroom and serving grant during that configured amount of time, the WRTU execute E-TFC selection assuming single-stream transmission. Otherwise, the WRTU execute E-TFC selection assuming dual stream transmission.

In another example, the WTRU determines the maximum rank based on a measurement indicative of its position in the cell and optionally a threshold configured by the network. More specifically, the WRTU may determine the transmission rank (or maximum transmission rank) to be used by comparing a measurement to the threshold. In one particular example, the WTRU is configured to use the UPH as a measurement. For example if the WTRU determines that the UPH is higher than the configured threshold the WTRU uses rank-2 transmission (or maximum rank-2 transmission); otherwise the WTRU uses rank-1 transmission. In other examples, the WTRU may also use other (existing) measurements such as Pathloss, CPICH RSCP, CPICH Ec/No, or any other relevant measurement.

In another example, the WTRU may be configured to receive rank-down indications from non-serving NodeBs.

For example, upon reception of a rank-down indication from a non-serving NodeB, the UE may lower its maximum rank to rank-1 operations (essentially operating in single-stream). This rank-down indication may be carried over an existing or new physical channel, for instance.

In another example, the WTRU may be configured to determine the rank also based on the value of the serving grant and configured threshold. In one particular example the WTRU is configured to use rank-1 transmission when the serving grant is below a configured value.

In another example, the WTRU is configured to use rank-1 transmission when the number of bits associated to the current serving grant is less than the aggregated number of bits associated to the minimum rank-2 transmission configured.

In another example, the WTRU is configured to use rank-2 transmission based on the data in its buffer. The amount of data available may be determined by the WTRU for instance based on the total data in the buffer, or based on the total data that can be multiplexed with the highest-priority non-empty logical channel (or MAC-d flow) in that HARQ process. The WTRU then compares the amount of data available for the next transmission to a threshold and determines whether to use rank-1 or rank-2 transmission based on the result of that comparison. The threshold may be an absolute threshold value, for example signaled by the network. This threshold value may also depend on the HARQ profile; for example the WTRU may be configured with one threshold value for each HARQ profile configured. Alternatively, the WTRU may determine the threshold value for each HARQ profile configured based on the known HARQ offset and a pre-defined threshold reference point (e.g. number of bits and HARQ offset pair). In another example, the threshold may be calculated for each HARQ profile as the sum of the bits across both streams for the smallest supported E-TFC combination or dual-stream operations. In one option the WTRU calculates the aggregated number of bits for the smallest supported E-TFC combination taking into account the current MIMO offset (i.e. the quality of the secondary stream as signaled by the NodeB). In another example, the WTRU calculates the threshold as being twice the number of bits on the primary stream for the minimum E-TFC combination supporting dual-stream transmission.

In another example, the WTRU is configured to use rank-2 transmission only when its normalized remaining power allows it (e.g. according to E-TFC restriction procedure). More specifically, the WTRU uses rank-2 transmission only when there is at least one supported E-TFC or E-TFC combination requiring rank-2 transmission that is supported.

In another example, the WTRU is configured to use rank-2 transmission based on the serving grant. More specifically, the WTRU determines whether its serving grant is sufficiently large to allow for rank-2 transmission. In one example, the WTRU is configured to use rank-2 transmission only when the serving grant is above a configured threshold. In one option, the WTRU may be configured with one threshold for each HARQ profile configured and apply the threshold associated to the HARQ profile of the highest priority logical channel which has a non-empty buffer. In another option, the WTRU determines the threshold for each HARQ profile configured based on a reference threshold and associated HARQ profile or HARQ offset.

In one example for determining the serving grant for each stream, the WTRU may calculate the serving grant for each stream of the rank-2 transmission based on a global grant and a grant offset (e.g. as described by equations (8) and (9) above) or on a power split factor. In one particular example, the WTRU determines the serving grant for each stream by dividing the serving grant (or global grant) in two.

In another example, the WTRU determines the number of bits that can be transmitted according to the serving grant for each stream and optionally a secondary stream power offset. The WTRU may carry out this calculation using the HARQ offset associated to the highest priority non-empty logical channel. In one example, the WTRU may be configured to compare the total number of bits that can be transmitted according to the serving grant and secondary stream offset to a configured threshold; if the WTRU determines that the number of bits that can be transmitted according to the serving grant and optionally secondary stream power offset is above the threshold than the WTRU uses rank-2 transmission; otherwise the WTRU uses rank-1 transmission. Alternatively, the WTRU determines the total number of bits that can be transmitted using the full serving grant on one stream only and compares it to a threshold. If the total number of bits is lower than the threshold the WTRU performs assumes single rank transmissions. If the total number of bits is higher than a threshold the WTRU may consider rank 2 transmission. In one example, the threshold may correspond to twice the number of bits of the minimum allowed E-TFC on the primary stream for dual stream transmission (e.g. minimum E-TFCI which can be combined and transmitted with rank-2).

In another example, the WTRU may be configured to use rank-2 transmission based on the number of bits that can be transmitted on the secondary stream according to the serving grant, and optionally a secondary power offset. The WTRU may calculate the number of bits that can be transmitted on the secondary stream for example using the HARQ offset associated to the highest priority non-empty logical channel. The WTRU may be configured to compare the number of bits that can be transmitted on the secondary stream according to the serving grant and secondary power offset to a threshold; if calculated number of bits is above the threshold then the WTRU uses rank-2 transmission otherwise the WTRU uses rank-1 transmission. In one example, the WTRU is configured with a fixed threshold for example via RRC signaling. In another example, the WTRU may be configured to use rank-2 transmission if the number of bits that can be transmitted on the secondary stream according to the serving grant and secondary power offset is above the minimum configured transport block size for the secondary stream; otherwise the WTRU uses rank-1 transmission.

The rank determination may be carried out by the WTRU for instance every TTI before E-TFC restriction or before E-TFC selection. This approach may reduce the complexity of the E-TFC restriction/selection algorithm significantly.

In one practical example, the WTRU is configured to use rank-2 transmission when the WTRU determines that it has sufficient power for rank-2 transmission (e.g. according to one of the above embodiment), and that it has a sufficiently large serving grant for rank-2 transmission (e.g. according to one of the above embodiment), and that it has sufficient data for rank-2 transmission (e.g. according to one of the above embodiment). If one or more of these criteria is not met the WTRU may be configured to use rank-1 transmission. If the WTRU according to this criteria, determines to use rank-2 transmission, it may perform E-TFC selection and E-TFC reselection according to the dual stream (rank-2) transmission formulas.

4.1 Example Techniques by which the WRTU Determines a Desired Rank

In an example, the WRTU may be configured to indicate to the network a whether or not it may make better use of a higher transmission rank. The indication may be carried, for example, on a single bit of the E-DCH control channel, i.e., on a new field of the E-DPCCH or S-E-DPCCH. Alternatively this indication may also be carried for example in the SI, in a new field.

The WRTU may set the desired rank indicator bit (DRI) according to one or more rules. In an example, the WRTU may be configured to set the DRI bit using one or a combination of the following rules: the WRTU sets the DRI to 0 when the WRTU determines that it is not able to empty its data buffer with its current grant and transmit power in a configured amount of time using rank-1 only; the WRTU sets the DRI to 0 only if its current grant and power headroom allows rank-2 transmission; and/or the WRTU sets the DRI to 0 if it non-buffer limited (that is it is transmitting with at the maximum rate it is allowed according to its serving grant).

In an example, the WRTU may only set the DRI to 0 if all of the above criteria are met. Otherwise, the DRI is set to 1.

In another example, the WTRU may be configured to transmit a request to the network for single-stream operations. This request may be carried for example on new field of the MAC header, or on the SI (e.g. L2 message); alternatively this request may also be carried on a physical channel. The WTRU may be configured to transmit requests to operate in single-stream or rank-1 when it is already configured to operate with up to rank-2 transmissions and it determines that it should be operating in single-stream mode (e.g. using one of the above conditions). The WTRU may also be configured to transmit request to operate in dual-stream or rank-2 operations when it is configured for rank-1 operations and determines (e.g. using one of the above condition) that it should operate in dual-stream mode.

In an alternate example, the happy bit in the second stream may be used to indicate to the network the rank preference. For instance, the "happy bit" in the E-DPCCH of the primary stream is set according to the existing rule, wherein the total power over both streams and the total grant over both stream is considered in the "happy bit" evaluation. The secondary stream is used to indicate to the network whether it prefers to use a rank-1 transmission or a rank-2. More specifically, in one example the happy bit may be set to "happy" if the UE is configured with rank-2 and the WTRU determines that it has enough available power to transmit using rank-2 (e.g. according to NRPM the UE determines that according to the set of supported E-TFCI, the UE supports rank-2 transmissions). The happy bit may be set to "happy" even if the UE doesn't have enough grant to transmit using rank-2, but it has the power to do so. If the UE doesn't have the power to transmit rank-2, optionally for a period of time, then the bit is set to "unhappy".

In another example, the happy bit is set to "happy", if the UE has more power available to transmit rank-2 transmission and to transmit with a higher E-TFCI than the current transmission, and has used up all its grant. Optionally, the available data may also be used in the determination of the happy bit setting. If the remaining amount data after the current transmit is above a threshold in addition to the conditions above the UE may set the happy bit in the second E-DPCCH, to "unhappy", else the bit is set to "happy".

5. Example Methods for E-TFC Selections

5.1 Single Transport Block

In a case where the MAC layer is configured to produce a single transport block irrespective of the number of streams used by the physical layer (PHY), an E-TFC selection procedure may be used. In one approach, the Maximum Supported Payload for each combinations of E-TFC supported may be calculated as the maximum number of bits aggregated over the two streams if two streams are transmitted, or over a single stream if single stream is transmitted.

5.2 Dual Transport Blocks

In accordance with embodiments of the present disclosure, rules for E-TFC selection may include the following.

The non-scheduled transmission may be limited to be transmitted only on the primary stream. The non-scheduled grant may be pre-configured in the WRTU via RRC signaling, note that the Node B may have to reserve resources to account for non-serving grants. Limiting the non-scheduled transmissions to the primary stream may simplify NodeB implementation and improve radio resource utilization. Indeed, as non-scheduled transmissions do not require a scheduled grant, the NodeB has to reserve a portion of the noise rise to potential non-scheduled transmissions. By restricting non-scheduled transmissions to the primary stream, the NodeB may only require to reserve resource for the primary stream. In addition, the secondary stream may be weaker and it may be more efficient to use the primary stream for non-scheduled transmissions (which may typically be more delay sensitive e.g. VoIP). Therefore it may be beneficial to restrict the non-scheduled transmissions on the primary stream only. It is understood, that if the non-scheduled data can be transmitted on any of the two streams, then power may not need to be pre-allocated for non-scheduled transmissions.

To minimize the WRTU transmission power and UL interference, whenever the WRTU's actual payload determined by buffer occupancy is less than the minimum of the Max Supported Payload and Total Granted Payload which both are evaluated based on an assumption of rank-2 transmission, the WRTU may first verify if its actual payload can be transmitted with rank-1 transmission by comparing it with the minimum of the Max supported Payload and Total granted Payload which both are evaluated based on an assumption of rank-1 transmission. If it cannot, rank-2 transmission is used.

In an example, the actual payload may be determined by the WRTU by calculating the total amount of data in the buffer that can be multiplexed (according to the multiplexing list) with the data in the highest priority queue which is non-empty. The maximum supported payload and total granted payload may be obtained or calculated by using the HARQ offset of the highest priority queue which is non-empty.

In another example, the actually payload determined as described above is compare against a threshold (e.g. minimum payload for considering a rank 2 transmission). If the payload is below this threshold then the UE proceeds to perform E-TFC selection and restriction assuming a single rank transmission. Otherwise, the UE may consider a rank 2 transmission. The rank 2 transmission may be further dependent on the grant and power.

6. Example Methods to Determine the Maximum Supported Payload (e.g., Based on Grant)

As part of E-TFC selection procedure, the WRTU may calculate the Maximum Supported Payload that is the maximum MAC PDU that can be sent by the WRTU during the upcoming transmission. The Maximum Supported Payload (MSP) is the maximum number of bits the WRTU can transmit based on available power and the power offset of the highest priority non-empty MAC flow. The total granted payload is the maximum amount of data that can be transmitted with the given scheduled grant and power offset and non-scheduled grant. If a scheduling information (SI) needs to be transmitted, the total granted payload also includes the number of bits associated to an SI. The Remaining available payload or the allowed payload is determined by the minimum value between Maximum supported Payload and the total granted payload. (e.g. min(Maximum Supported Payload, Total Granted Payload).

Depending on the WRTU configuration and on the number of streams, the WRTU may calculate the Remaining available Payload in a different way. The following approaches for calculation of Remaining available Payload may be executed by the WRTU based on its configuration.

6.1 Single Stream Transmission

In calculating the Remaining available Payload for single stream transmission, the WRTU may use the conventional method, where the maximum number of bits is determined based on the minimum of the number of bits corresponding to the grants and optionally SI (e.g. Total Granted Payload) and number of bits of the largest supported E-TFC for the power offset of the HARQ profile under considerations (e.g. Maximum Supported Payload).

6.2 Dual Stream Transmission Assuming Equal Power Between Streams

In this context, there are a number of possible situations where the WRTU may need to calculate the Remaining available Payload.

In a first situation, the WRTU may be configured to transmit with dual-stream, the HARQ process is empty and the HARQ entity requests two (new) streams for transmission. In such cases, the WRTU may calculate the Remaining available Payload for the first stream as follows:

6.2.1 First Stream:

The WRTU determines the HARQ profile and the corresponding power offset for the upcoming transmission. The WRTU determines the largest supported E-TFC for the primary stream for the corresponding power offset (e.g. Maximum Supported Payload) according to any of the methods described above. The WRTU then determines the largest payload it can support on the primary stream according to the grant. Since dual stream transmissions is assumed, the WRTU scales the total Serving Grant by a preconfigured ratio. This ratio may be predetermined in the specifications (e.g. 0.5). This ratio may also be the same as the $\gamma_{NRPM}$ (as defined in Section 2.2.3). The WRTU calculates the number of bits according to the appropriate formula in the MAC protocol specifications (i.e. using the same equations as in eqs. (33) (34), but with $\Delta$MIMO=0 dB and with the scaled Serving Grant in place of $P_{o,stream1}$). This value corresponds to the available granted payload. The WTRU may then determine the available non-scheduled payload by summing up the non-scheduled grants of the allowed MAC-d flow. The "total granted payload" is then the sum of available granted payload and the available non-scheduled payload and SI if SI is to be transmitted. The WRTU then calculates the Remaining Available Payload as the minimum of the largest E-TFC and the maximum number of bits according to the "total granted payload". Note that in this example the non-scheduled data are sent over the primary stream.

6.2.2 Second Stream:

For the second stream, the WRTU may use the power offset of the E-DPDCH as calculated on the primary stream (after the WRTU via E-TFC selection has chosen the E-TFC for the primary stream), and the $\Delta$MIMO signaled by the NodeB to calculate the maximum number of bits supported by the secondary stream according to the grant and MIMO channel conditions (e.g. available granted payload for secondary stream). Since from the onset the WRTU has assumed dual stream transmission, and the secondary stream is transmitted at the same power than the primary stream, there is no need in this case to verify whether or not the WRTU has sufficient power for a given transport block. However, the secondary channel conditions may be inferior to the primary channel conditions. Thus the WRTU calculates the Remaining Available Payload based on the following. First, the WRTU determines the power offset of the secondary stream transmission based on the power offset of the primary stream transmission as determined by the reference gain factors and the E-TFC selected for the first stream. Then, the WRTU then calculates the maximum number of bits that can be transmitted on the secondary stream that is the Remaining Available Payload using the secondary stream power offset signaled by the NodeB ($\Delta$MIMO) using for equations (33) and (34) depending on the configuration.

Since in this example non-scheduled data are in the primary stream, then the total granted payload is equivalent to the available granted payload plus scheduling information bits if an SI is going to be transmitted on the secondary stream. Additionally in this example, the UE doesn't have to determine the supported E-TFCs for the second stream.

This procedure for the second stream may also apply for the case where the WRTU is configured for a dual-stream transmission and a retransmission is on-going. In that case, the new transmission may be mapped to the second stream and the WRTU uses this procedure to calculate the MSP for the secondary stream only (no need to calculate the MSP for the primary stream as it is retransmitting).

In the case where the WRTU is configured to transmit a single transport block over two streams, the number of bits that can be transmitted corresponds to the total number of bits for the first and second stream added together.

Alternatively, in another example, the WTRU may determine the number of granted bits for the secondary stream by determining the secondary stream grant by the preconfigured ratio (e.g. $(1-\gamma)$SGtot). The UE then using the SG2 and the MIMO offset signaled by the network (or the new reference E-TFCI) may determine the available granted payload for secondary stream. The WTRU based on the E-TFC restriction for the secondary stream and available power determines the "maximum supported payload" for the secondary stream. This may correspond to a supported payload using the same power as the primary stream, but after accounting for a MIMO offset and/or potentially a new HARQ power offset for the secondary stream. Alternatively, the "maximum supported payload" may correspond to the value determined according to E-TFC restriction after the power was split accordingly across both streams. For both examples above, when determining the number of bits for the second stream, the UE may determine a new higher priority MAC-d flow (e.g. if the highest priority MAC-d flow) has emptied its buffer on the primary stream, or it is not allowed to be transmitted on the secondary stream (e.g. for non-scheduled transmissions). According to the new higher priority MAC-d flow the UE may determine a new HARQ profile power offset to use in the formula for determination of the number of bits it can transmit.

For both example, the E-TFC selection after determining the remaining available payload fills up the TB to be transmitted on a primary stream up to a maximum of "remaining available payload". According to the priority of the logical channels or MAC-d flow, the UE fills up the TB with data up to a minimum of available data in the buffer, available granted payload (if the MAC-d flow is a non-scheduled flow, up to non-scheduled grant for that MAC-d flow), and "remaining available payload". The UE then moves on to a next highest priority MAC-d flow if space is still available in the TB according to the remaining available payload for the first stream and so on. Once the primary stream is filled up, then the UE moves to the second stream. At this point as described above, the new highest priority MAC-d flow may be determined and thus the new HARQ profile (power offset) to use as an input to E-TFC selection/restriction to determine the number of bits that can be transmitted on the second stream. Alternative, the same HARQ power offset as in the primary stream is used. Based on the determined available remaining payload the WTRU fills up the secondary stream.

In the case where the power used over both stream has to be equal and if there isn't enough data to fill up the transport block on the second stream the WTRU may pad the MAC PDU or alternatively, use a smaller transport block to transmit the remaining data.

In an example where non-scheduled transmissions can be sent over both primary and secondary stream, the UE may determine the "available granted payload on the first stream", the "maximum supported payload on the first stream" and the "available non-scheduled granted payload". The UE may then fill up the TB of the first stream according to the remaining available payload. Then when filling up the second stream the WTRU may determine the highest priority MAC-d flow and based on this HARQ profile the new power offset to use. Optionally, the same as the primary stream may be used. Based on the power offset, MIMO offset, allowed grant on second stream, and power the UE may determine the "available granted payload on the second stream", the "maximum supported payload on the second stream" and the "available non-scheduled granted payload". The "available non-scheduled granted" payload maybe determined again for the second stream may correspond to the remaining data after the first stream was filled up with data (e.g. "available non-scheduled granted payload" minus the non-scheduled data already transmitted on the primary stream"). Optionally, the "available non-scheduled granted payload" may consider the new MAC-d flows that can be multiplexed in the second stream according to the newly determined highest priority MAC-d flow. The UE may then fill up the second transport block according to the determined "remaining available payload" and the priorities of MAC-d flows and the scheduled/non-scheduled grants.

7. Example Methods for Transport Format Selection and Transmission

Methods for example transport format selection for dual-stream operations are described herein. The legacy transport format selection algorithm for E-DCH attempts to choose an efficient transport format for a certain codeword based on a number of parameters. An example algorithm is provided here and follows.

The maximum amount of puncturing that can be applied is

1-$PL_{non-max}$ if the modulation scheme or the number of code channels is less than the maximum allowed by the WRTU capability and restrictions imposed by UTRAN;

1-$PL_{mod\_switch}$ if the modulation scheme is BPSK, the number of E-DPDCH code channels equals to 4 and the usage of 4PAM is allowed by the WRTU capability and restrictions imposed by UTRAN; and 1-$PL_{max}$ if the modulation scheme and the number of code channels equals to the maximum allowed by the WRTU capability and restrictions imposed by UTRAN.

The number of available bits per TTI of one E-DPDCH for all possible spreading factors and modulation schemes is denoted by $N_{256}$, $N_{128}$, $N_{64}$, $N_{32}$, $N_{16}$, $N_8$, $N_4$, $N_2$, $M_4$ and $M_2$ where the index refers to the spreading factor. N refers to BPSK modulation and M to 4PAM modulation.

The possible number of bits available to the CCTrCH of E-DCH type on all PhCHs, $N_{e,data}$, then are $\{N_{256}, N_{128}, N_{64}, N_{32}, N_{16}, N_8, N_4, 2 \times N_4, 2 \times N_2, 2 \times N_2 + 2 \times N_4, 2 \times M_2 + 2\Delta M_4\}$ SET0 denotes the set of $N_{e,data}$ values allowed by the UTRAN and supported by the WRTU, as part of the WRTU's capability. SET0 can be a subset of $\{N_{256}, N_{128}, N_{64}, N_{32}, N_{16}, N_8, N_4, 2 \times N_4, 2 \times N_2, 2 \times N_2 + 2 \times N_4, 2 \times M_2 + 2 \times M_4\}$.

The total number of bits in a TTI before rate matching with transport format j is $N_{e,j}$. The total number of bits available for the E-DCH transmission per TTI with transport format j, $N_{e,data,j}$, is determined by executing the following algorithm, where $PL_{non-max}$ is signaled from higher layers, $PL_{mod\_switch}$ is equal to 0.468 and $PL_{max}$ is equal to 0.44, except when the $N_{e,data} = 2 \times N_2 + 2 \times N_4$ or $2 \times M_2 + 2 \times M_4$ is allowed by the UTRAN and supported by the WRTU, in which case $PL_{max}$ is equal to 0.33:

---

SET1 = { $N_{e,data}$ in SET0 such that $N_{e,data} - N_{e,j}$ is non negative }
If SET1 is not empty and the smallest element of SET1 requires just one E-DPDCH
    then
        $N_{e,data,j}$ = min SET1
    Else
        SET2 = { $N_{e,data}$ in SET0 such that $N_{e,data} - PL_{non-max} \times N_{e,j}$ is non negative }
        If SET2 is not empty then
            Sort SET2 in ascending order
            $N_{e,data}$ = min SET2
            While $N_{e,data}$ is not the max of SET2 and the follower of $N_{e,data}$ requires only
                one E-DPDCH do
                $N_{e,data}$ = follower of $N_{e,data}$ in SET2
            End while
            If $N_{e,data}$ is equal to $2 \times M_2 + 2 \times M_4$ and $N_{e,data} / ([2 \times] N_{e,j}) \geq PL_{mod\_switch}$
                $N_{e,data}$ = $2 \times N_2 + 2 \times N_4$
            End if
            If $N_{e,data}$ is equal to $2 \times N_2 + 2 \times N_4$ and $N_{e,data} / N_{e,j} < PL_{mod\_switch}$
                $N_{e,data}$ = max SET0
            End if
            $N_{e,data,j}$ = $N_{e,data}$
    Else
        $N_{e,data,j}$ = max SET0 provided that $N_{e,data,j} - PL_{max} \times N_{e,j}$ is non negative
    End if
End if

---

While E-DCH TTI length is 10 ms, if an initial transmission occurs in a compressed frame, or a retransmission occurs in a compressed frame, or a retransmission occurs in a non-compressed frame for which initial transmission was compressed, the number of available bits per TTI of one E-DPDCH for all possible spreading factors denoted by $N_{256}$, $N_{128}$, $N_{64}$, $N_{32}$, $N_{16}$, $N_8$, $N_4$ and $N_2$ used in the algorithm above is replaced by $k \times N_{256}$, $k \times N_{128}$, $k \times N_{64}$, $k \times N_{32}$, $k \times N_{16}$, $k \times N_8$, $k \times N_4$ and $k \times N_2$. The parameter k is equal to $n_{tx1}/15$ and $n_{tx1}$ is defined in 4.5.1.

It is noted that the multiplicative factor of 2 in square brackets (highlighted) above is added with respect to the specifications as it would reflect the intended behavior.

Since the legacy transport selection algorithm for E-DCH only support single-stream operations, a new method is needed to support dual-stream operations.

7.1 Single Codeword

In an embodiment, a WRTU may use a single transport format when transmitting with two streams. In an example, a WRTU uses dual-stream only when the first stream can transmit with 2SF2+2SF4 and the second stream is also transmitted with the 2SF2+2SF4 format (optionally with 16 QAM operations). In the case of a single codeword, the WRTU has to map the information symbols to the physical channels appropriately. To ensure proper reception for the second stream, the WRTU has to determine the appropriate code rate for the second stream.

7.1.1 Using Signaled Value for SNR Difference Between Streams

In an embodiment, a network may inform a WRTU with a specific SNR ratio or number of bits ratio between the two streams first. For example, a NodeB may signal the WRTU on a dynamic basis an index that indicates the relative amount of information between the secondary and primary stream. Table 4 below shows an example where an index points to both the SNR difference between the two streams and the ratio of bits between stream 2 and stream 1. It is noted that the last entry in the table corresponds to the case where the NodeB indicates to the WRTU that the second stream should not be used.

TABLE 4

| Index signaled by NodeB | SNR difference (in dB) | Nb bits ratio ($\alpha$) |
|---|---|---|
| 0 | 0 | 1 |
| 1 | −1 | 4/5 |
| 2 | −2 | 2/3 |
| 3 | −3 | 1/2 |
| 4 | −4 | 2/5 |
| 5 | −5 | 1/3 |
| 6 | −6 | 1/4 |
| 7 | −infinity | 0 |

In an embodiment, a WRTU may apply repetition to compensate for the difference in SNR between the first and second stream. This may be achieved for example as follows. After E-TFC selection, the WRTU may apply a CRC and encode the transport block using the conventional 3GPP turbo coder (for E-DCH). The WRTU may then calculate the total number of symbols available for transmission by applying the ratio of number of bits ($\alpha$) signaled by the network (e.g. using Error! Reference source not found.). To simplify, the notation is used where the number of bits available for the 2SF2+2SF4 transport format is 2N2+2N4 and 2M2+2M4 for the QPSK and 16QAM cases, respectively. Then the total number of bits available for transmission when applying the ratio $\alpha$ may be expressed for QPSK and 16QAM respectively as:

$$N_{data} = \lfloor (1+\alpha)(2N_2+2N_4) \rfloor, \text{ and} \quad (36)$$

$$N_{data} = \lfloor (1+\alpha)(2M_2+2M_4) \rfloor, \quad (37)$$

where "$\lfloor X \rfloor$" denotes rounding X down to the closest integer. Alternatively, the WRTU may also use the following relations instead:

$$N_{data} = (2N_2+2N_4) + \lfloor \alpha(2N_2+2N_4) \rfloor, \text{ and} \quad (38)$$

$$N_{data} = (2M_2+2M_4) + \lfloor \alpha(2M_2+2M_4) \rfloor \quad (39).$$

The WRTU may then apply the conventional rate matching algorithm with $N_{data}$ as above. After rate matching the WRTU may map an appropriate number of bits to the first stream (e.g., $2N_2+2N_4$ or $2M_2+2M_4$) and the appropriate number of bits to the second stream (e.g., $\lfloor \alpha(2N_2+2N_4) \rfloor$ or $\lfloor \alpha(2M_2+2M_4) \rfloor$). Optionally, the WRTU may scramble the bits such that adjacent bits may not be necessarily mapped to the same stream. The WRTU may then apply repetition according to the ratio to the second stream such that all transmitted symbols are mapped to an information bit. This may be achieved by repeating every N bit, where N is derived from the inverse of the ratio $\alpha$. For example, when $\alpha=1/2$, every second bit is repeated when mapped to the physical channel on the second stream. Optionally, an offset potentially linked to the RSN may be applied to the starting point in the repetition scheme such that between retransmission not only the same bits get repeated. This may improve reception reliability.

7.1.2 Open Loop Approach

In an embodiment, the WRTU is configured for dual streams operations using a single power control loop (the legacy power control loop) and no other controlling loop for the second stream. Thus, the single codeword is interleaved between the two layers or streams. The transport format selection determines for a given codeword size the actual transmission format, that is the number of channelization codes to use, the spreading factor for each, the modulation and whether or not two streams or layers are used.

For MIMO operations, additional formats become available. In this section, it is assumed that when using dual-stream transmission, the same transport format is used on each stream. In the context of open loop MIMO operations, this assumption is relevant as the WRTU has no information on the quality of each stream. Note however that the following solutions, although described in the context of open loop MIMO operations may also be applicable to closed loop MIMO.

The number of available bits per TTI of one E-DPDCH for all possible spreading factors and modulation schemes for dual stream is denoted by $DN_{256}, DN_{128}, DN_{64}, DN_{32}, DN_{16}, DN_8, DN_4, DN_2, DM_4$ and $DM_2$ where the index refers to the spreading factor. N refers to BPSK modulation and M to 4PAM modulation. Thus, for all values of $j=256, 128, \ldots 2$, we have that $DN_j=2 \times N_j$ and similarly $DM_j=2 \times M_j$.

Table 5 below lists the number of bits for each transport format for both single and dual streams. It can be observed from this table that most of the time the number of bits that can be carried using dual-stream is double the number of bits for the single-stream case one entry above. The case of 4 channelization codes for single-stream operations is slightly different, and it can be observed the dual-stream entry below actually supports larger number of bits (15360 bits vs 11520 bits).

TABLE 5

| Single stream | | Dual streams | |
|---|---|---|---|
| Format | Number of bits | Format | Number of bits |
| $N_{256}$ | 30 | $DN_{256}$ | 60 |
| $N_{128}$ | 60 | $DN_{128}$ | 120 |
| $N_{64}$ | 120 | $DN_{64}$ | 240 |
| $N_{32}$ | 240 | $DN_{32}$ | 480 |
| $N_{16}$ | 480 | $DN_{16}$ | 960 |
| $N_8$ | 960 | $DN_8$ | 1920 |
| $N_4$ | 1920 | $DN_4$ | 3840 |

TABLE 5-continued

| | Single stream | | Dual streams |
| --- | --- | --- | --- |
| Format | Number of bits | Format | Number of bits |
| $2 \times N_4$ | 3840 | $2 \times DN_4$ | 7680 |
| $2 \times N_2$ | 7680 | $2 \times DN_2$ | 15360 |
| $2 \times N_2 + 2 \times N_4$ | 11520 | $2 \times DN_2 + 2 \times DN_4$ | 23040 |
| $2 \times M_2 + 2 \times M_4$ | 23040 | $2 \times DM_2 + 2 \times DM_4$ | 46080 |

In practical channels, there is typically a performance (or efficiency) penalty associate to dual-stream transmissions, due for example to inter-stream interference and non-ideal receivers. Likewise there is a performance cost going to higher order modulation (e.g. 4PAM) due not only to channel distortion but also due to the receiver needing to also reliably detect the amplitude in the signal. Thus, it may be preferable that for the same transport block size the transport format selection chooses dual-stream operations over 16QAM operations, depending on the configuration and the code rate. The transport format selection algorithm described herein may provide the means for such decisions, driven by network configured parameters.

In an embodiment, the WRTU may be configured with a puncturing limit that determines when to use rank-2 transmissions and/or 16QAM. For convenience, this new puncturing limit is referred to as $PL_{MIMO}$. The following sections describe examples of using this approach for TF selection.

7.1.2.1 Dual-Stream Only—or Dual-Stream Preferred Over HOM

In a first example of this approach, dual-stream operations are preferred from an energy efficiency standpoint over HOM. This preference may be for example due to performance evaluation supporting different receiver architectures, or due to a desire to simplify some design aspects etc.

For the purpose of simplifying the discussion and without loss in generality, it is first assumed that the WRTU is not configured for 16QAM operations and that the transport formats $2 \times DN_2$, and $2 \times DN_2 + 2 \times DN_4$ are supported (by both WRTUs and UTRAN). Because of the additional performance penalty offered by dual-stream operations, the concept here is to favor a more aggressive puncturing over dual-stream transmissions for the same amount of bits. Using as an example the algorithm described above, when the WRTU selects the smallest transport format that uses dual-stream, the new puncturing limit $PL_{MIMO}$ is used to make the final decision as to whether or not single-stream transmission (with at higher puncturing) should be used instead. The concept is illustrated at a high level for MIMO TF selection for the case of no HOM support by the example flow chart in FIG. 1. The algorithm in FIG. 1 illustrates only the relevant part of the transport format selection algorithm and it could be understood that it is to be inserted within the existing algorithm.

Various embodiments may be implemented (again, without HOM support, assuming $2 \times DN_2$ is the smallest dual-stream transmission supported format) within the existing TF selection algorithm using the following example (where the underlined text is new, and where it is assumed that $PL_{MIMO}$ has been defined such that it corresponds to the desired data rate limit, and where SET0 contains the following entries: SET0 can be a subset of $\{N_{256}, N_{128}, N_{64}, N_{32}, N_{16}, N_8, N_4, 2 \times N_4, 2 \times N_2, 2 \times N_2 + 2 \times N_4, 2 \times DN_2, 2 \times DN_2 + 2 \times DN_4\}$.

SET1 = { $N_{e,data}$ in SET0 such that $N_{e,data} - N_{e,j}$ is non negative }
If SET1 is not empty and the smallest element of SET1 requires just one E-DPDCH
   then
      $N_{e,data,j}$ = min SET1
Else
   SET2 = { $N_{e,data}$ in SET0 such that $N_{e,data} - PL_{non-max} \times N_{e,j}$ is non negative }
   If SET2 is not empty then
      Sort SET2 in ascending order
      $N_{e,data}$ = min SET2
      While $N_{e,data}$ is not the max of SET2 and the follower of $N_{e,data}$ requires only
         one E-DPDCH do
         $N_{e,data}$ = follower of $N_{e,data}$ in SET2
      End while
      If $N_{e,data}$ is equal to $2 \times DN_2$ and $N_{e,data} / (2 \times N_{e,j}) \geq PL_{MIMO}$
         $N_{e,data} = 2 \times N_2 + 2 \times N_4$
      End if
      If $N_{e,data}$ is equal to $2 \times N_2 + 2 \times N_4$ and $N_{e,data} / N_{e,j} < PL_{MIMO}$
         $N_{e,data}$ = max SET0
      End if
      $N_{e,data,j} = N_{e,data}$
   Else
      $N_{e,data,j}$ = max SET0 provided that $N_{e,data,j} - PL_{max} \times N_{e,j}$ is non negative
   End if
End if Likewise, for the case where the minimum supported dual-stream format consists of $2 \times DN_2 + 2 \times DN_4$, that is SET0 can be a subset of $\{N_{256}, N_{128}, N_{64}, N_{32}, N_{16}, N_s, N_4, 2 \times N_4, 2 \times N_2, 2 \times N_2 + 2 \times N_4, 2 \times DN_2 + 2 \times DN_4\}$, then the above algorithm may be modified as follows:

SET1 = { $N_{e,data}$ in SET0 such that $N_{e,data} - N_{e,j}$ is non negative }
If SET1 is not empty and the smallest element of SET1 requires just one E-DPDCH
   then
      $N_{e,data,j}$ = min SET1
Else
   SET2 = { $N_{e,data}$ in SET0 such that $N_{e,data} - PL_{non-max} \times N_{e,j}$ is non negative }
   If SET2 is not empty then
      Sort SET2 in ascending order
      $N_{e,data}$ = min SET2
      While $N_{e,data}$ is not the max of SET2 and the follower of $N_{e,data}$ requires only
         one E-DPDCH do
         $N_{e,data}$ = follower of $N_{e,data}$ in SET2
      End while
      If $N_{e,data}$ is equal to $2 \times DN_2 + 2 \times DN_4$ and $N_{e,data} / (2 \times N_{e,j}) \geq PL_{MIMO}$
         $N_{e,data} = 2 \times N_2 + 2 \times N_4$
      End if
      If $N_{e,data}$ is equal to $2 \times N_2 + 2 \times N_4$ and $N_{e,data} / N_{e,j} < PL_{MIMO}$
         $N_{e,data}$ = max SET0
      End if
      $N_{e,data,j} = N_{e,data}$
   Else
      $N_{e,data,j}$ = max SET0 provided that $N_{e,data,j} - PL_{max} \times N_{e,j}$ is non negative
   End if
End if Similarly, this algorithm can be extended to the case where the WRTU also supports 16QAM or HOM operations. For convenience of presentation, but without loss of generality, the algorithm will be presented assuming that the only allowed format for dual-stream operations consists of the case $2 \times DN_2 + 2 \times DN_4$ (that is 2 streams each with 4 channelization codes).

In this case, the WRTU may have yet another code rate limit to consider; that is a code rate limit to allow switching from dual-stream operations to dual-stream operations+

16QAM. Here the concept is similar as above in that there is a performance penalty when using higher order modulations, which may be larger than the performance penalty incurred by going to dual stream operations. This performance penalty may depend on the receiver implementation, the number of receive antennas, their relative placements, the channel realization etc.

Figure 2:
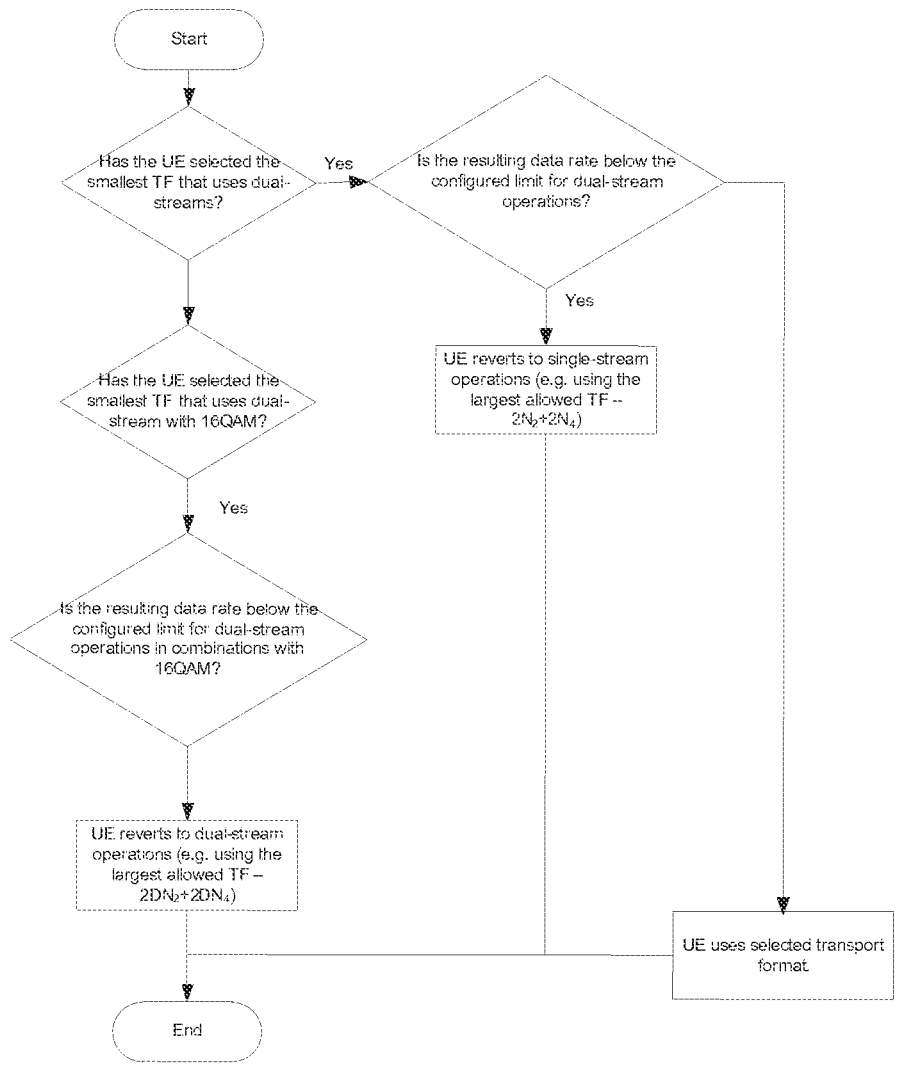
FIG. 2 is a flow chart for dual-stream transport format selection with HOM.

FIG. 2 illustrates the concept in an example flow chart form for TF selection for the case where HOM or 16QAM is supported. The algorithm in FIG. 2 illustrates only the relevant part of the transport format selection algorithm and it could be understood that it is to be inserted within the existing algorithm.

Various embodiments may be implemented within the existing TF selection algorithm using the following example where without loss of generality:

$PL_{MIMO}$ corresponds to the data rate limit whereby the WRTU decides to use dual-stream operations or not;

$PL_{MIMO-HOM}$ corresponds to the data rate limit whereby the WRTU decides to use dual-stream operations with or without HOM; and SET0 contains the following entries: SET0 can be a subset of $\{N_{256}, N_{128}, N_{64}, N_{32}, N_{16}, N_8, N_4, 2\times N_4, 2\times N_2, 2\times N_2+2\times N_4, 2\times DN_2, 2\times DN_2+2\times DN_4, 2\times DM_2+2\times DM_4\}$.

$PL_{MIMO}$ and $PL_{MIMO-HOM}$ may be fixed in the specifications or configured by the network for example via RRC signaling. It can be noted that in this configuration use of single-stream 16QAM operations is not permitted as it is assumed here that it is a less efficient transmission scheme for the same data rate than dual-stream operations without HOM. The algorithm may be implemented in a similar way as the shown above.

Similar embodiments may also be applied for 64QAM operations; in such cases the WTRU may be configured with more than one set of puncturing limit. The WTRU may be configured with one set of puncturing limit threshold for each higher-order modulation that is configured (for 16QAM and 64QAM).

7.1.2.2 Use of HOM Rather than Dual-Stream Transmission

In another example of this approach, HOM modulation operations may be used rather than dual-stream transmissions. Again, this decision may be for example due to performance evaluation supporting different receiver architectures, or due to a desire to simplify some design aspects, etc.

The decision to use dual-stream transmission in this case may be driven as well by data rate considerations. To account for the additional performance penalty associated to going from 16QAM operations to dual-stream in combination to 16QAM operations, the WRTU may determine when to use dual-stream based on a puncturing limit (e.g. $PL_{MIMO-HOM}$). Various embodiments may be implemented within the existing TF selection algorithm using the following example where without loss of generality:

$PL_{MIMO-HOM}$ corresponds to the data rate limit whereby the WRTU decides to use dual-stream operations with or without HOM; and SET0 contains the following entries: SET0 can be a subset of $\{N_{256}, N_{128}, N_{64}, N_{32}, N_{16}, N_8, N_4, 2\times N_4, 2\times N_2, 2\times N_2+2\times N_4, 2\times M_2+2\times M_4, 2\times DM_2+2\times DM_4\}$.

$PL_{MIMO-HOM}$ may be fixed in the specifications or configured by the network for example via RRC signaling.

Figure 3:
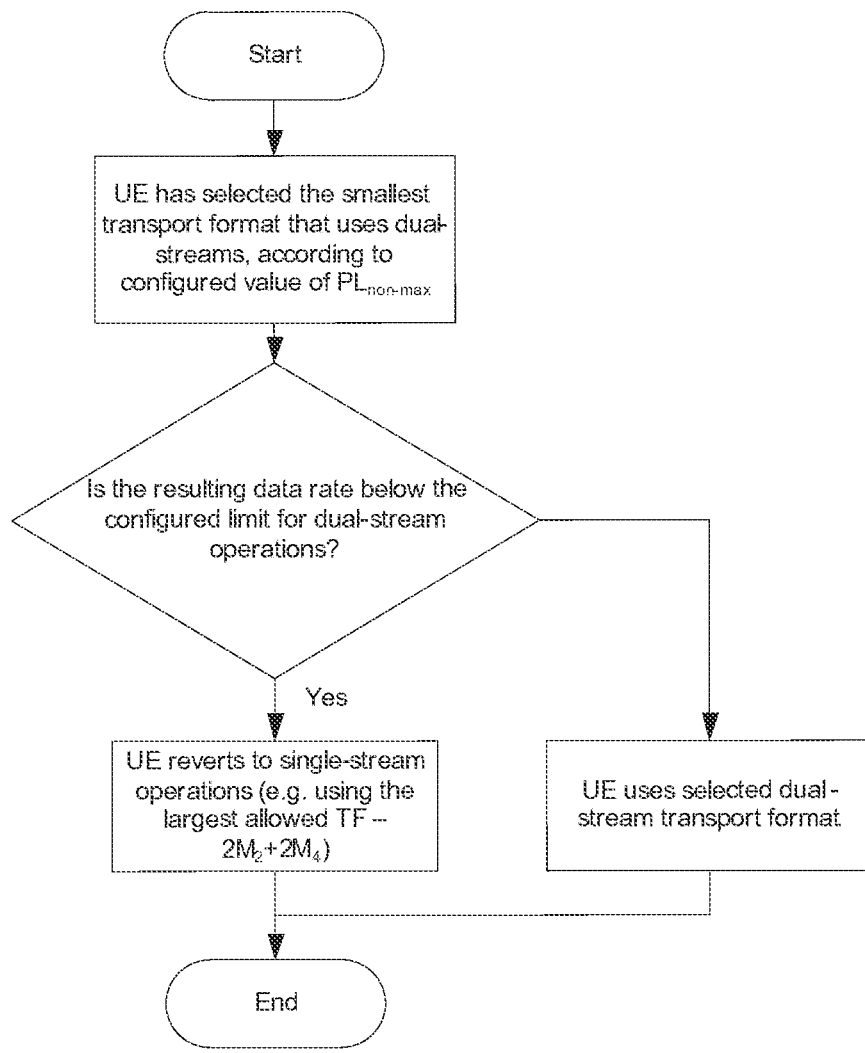
FIG. 3 is a flow chart that illustrates a transport format selection algorithm.

A flow chart in accordance with various non-limiting embodiment is shown in FIG. 3. Note that the figure illustrates only the relevant part of the transport format selection algorithm and it could be understood that it is to be inserted within the existing algorithm.

This can be achieved for example as described in the following algorithm:

```
SET1 = { N_{e,data} in SET0 such that N_{e,data} - N_{e,j} is non negative }
If SET1 is not empty and the smallest element of SET1 requires just one
E-DPDCH
    then
    N_{e,data,j} = min SET1
Else
    SET2 = { N_{e,data} in SET0 such that N_{e,data} - PL_{non-max} × N_{e,j} is non
    negative }
    If SET2 is not empty then
        Sort SET2 in ascending order
        N_{e,data} = min SET2
        While N_{e,data} is not the max of SET2 and the follower of N_{e,data}
        requires only
            one E-DPDCH do
            N_{e,data} = follower of N_{e,data} in SET2
        End while
        If N_{e,data} is equal to 2×DM_2+2×DM_4 and N_{e,data} / ([2×]N_{e,j} )≥
        PL_{MIMO-HOM}
            N_{e,data} = 2×M_2+2×M_4
        End if
        If N_{e,data} is equal to 2×M_2+2×M_4 and N_{e,data} / N_{e,j} <
        PL_{MIMO-HOM}
            N_{e,data} = max SET0
        End if
        If N_{e,data} is equal to 2×M_2+2×M_4 and N_{e,data} / ([2×]N_{e,j} )≥
        PL_{mod_switch}
            N_{e,data} = 2×N_2+2×N_4
        End if
        If N_{e,data} is equal to 2×N_2+2×N_4 and N_{e,data} / N_{e,j} < PL_{mod_switch}
            N_{e,data} = 2×M_2+2×M_4
        End if
        N_{e,data,j} = N_{e,data}
    Else
        N_{e,data,j} = max SET0 provided that N_{e,data,j} - PL_{max} × N_{e,j} is non
        negative
    End if
End if
```

Similar embodiments may also be applied for 64QAM operations; in such cases the WTRU may be configured with more than one set of puncturing limit. The WTRU may be configured with one set of puncturing limit threshold for each higher-order modulation that is configured (for 16QAM and 64QAM).

8. Example Complete E-TFC Restriction/E-TFC Selection Procedure Examples

A number of example procedures for E-TFC restriction/selection using some of the methods described above are described in specific context below.

8.1 Example 1: Single Grant, Power Offset for $2^{nd}$ Stream, 2 TB

In this example, it is assumed that the WRTU receives a single serving grant from the network with an additional power offset or transport block size offset for the $2^{nd}$ stream. It is assumed that up to 2 transport blocks are being transmitted, possibly over up to 2 separate HARQ processes.

In this scenario, it is further assumed that there is no power pre-allocation for the non-scheduled transmissions, that the power of the E-DPDCH on the secondary stream is the same as the power of the E-DPDCH on the primary stream, and that both stream use the same transport format (e.g. both streams using 2SF2+2SF4) when dual-stream is applied.

Note, however, that the embodiments and examples being described may also be applicable to the case where power pre-allocation is carried out. In the case where power pre-allocation is carried out, the WTRU may pre-allocate twice the power needed for non-scheduled transmissions in the case where dual-stream is applied. This would ensure that the non-scheduled transmission can be transmitted using dual-stream. Alternatively, only one power pre-allocation is performed and the power pre-allocated for non-scheduled transmissions may be used on any of the streams. The power pre-allocation may be tried to be used on the first stream first, however, if according to priorities the primary stream doesn't allow for all non-scheduled data to be transmitted, then the remaining of the power pre-allocated for non-scheduled transmissions may be used on the secondary stream. Alternatively, if the WTRU can transmit on any of the two streams then no power pre-allocation for non-scheduled transmissions may be performed. If the WTRU determines that single-stream transmission is used, then the WTRU may use the conventional approach (i.e. without power pre-allocation).

In this example procedure for this scenario, the WRTU follows these steps (in any order or combination). The WRTU calculates the set of supported E-TFCs for the primary stream, assuming single stream transmission and also assuming dual-stream transmission. This may be carried out for example using the methods described above. The WRTU determines how many HARQ retransmissions will be taking place in the upcoming E-DCH transmission. If less than two retransmissions are taking place, the WRTU determines how many streams to use in the upcoming E-DCH transmission. This may be carried out using the methods described above. If the WRTU determine that single-stream transmission should be used, the WRTU executes the remaining part of the conventional E-TFC Selection procedure may be executed for the primary stream using the set of supported E-TFCs calculated assuming single-stream transmission and the WRTU then creates a single PDU and delivers it to the physical layer for transmission over a single stream. Otherwise, if the WRTU determines that dual-stream transmission should be used. If two streams are required by the HARQ entity (e.g. there is no retransmissions going on), or the WRTU is configured to transmit two streams. The WRTU suitably executes the E-TFC selection procedure, where the Remaining Available Payload is calculated according to the method described above. After the E-TFC selection procedure is completed for the first stream, the WRTU determines the power used on the first stream (for example by applying the E-DPDCH power interpolation or extrapolation, depending on the WRTU configuration). The WRTU may determine the Remaining Available Payload for the second stream as described above. The WRTU then completes the E-TFC selection for the second stream. Otherwise, if one additional stream is required by the HARQ entity (i.e. there is an on-going transmission on the primary stream, and the HARQ entity requests data for the secondary stream or the WRTU is configured to transmit two streams), then the WRTU determines the power used on the first stream and determines if it has sufficient headroom to transmit a secondary stream (for example at the same power). If the WRTU determines that it has sufficient power to transmit a secondary stream then The WRTU determines the Remaining Available Payload for the second stream based for example on the procedure for the secondary stream described above. The WRTU then executes E-TFC selection for the second stream. The WRTU MAC layer delivers the PDU(s) to be transmitted to the physical layer, where the WRTU applies the appropriate physical channel processing to map the PDU to the TF selected. The WRTU may be configured to use the same transport format on both streams. In such cases, the WRTU physical layer may apply the existing rate matching (including puncturing or repeating) to both streams independently.

Note that in the case where the current HARQ process does not allow dual stream transmission, for example due to configuration restriction or due to a HARQ retransmission taking place, the WRTU may only calculate the set of supported and blocked E-TFCs for the single stream case.

In an example of this scenario, the WRTU may be configured with joint HARQ processes, wherein the retransmissions and new transmissions always occur at the same time for both transport block. This approach can allow for reducing the signaling overhead associated to the transmission of two separate sets of ACK/NACK. In this configuration thus, the WRTU monitors a single set of signals for ACK/NACK. When the WRTU receives an ACK, it assumes that all TB associated to the relevant TTI have been received correctly by the NodeB. Conversely, when the WRTU receives a NACK, it retransmits all the TBs associated to the relevant TTI.

In addition, if the WRTU is configured to perform stream re-mapping (that is the WRTU remaps the secondary to the primary stream when only the secondary stream is retransmitting), then the WRTU may re-calculate the amount of power required for the retransmission (for example, using the existing rules according to the HARQ profile and transport block size).

8.2 Example 2: Single Grant, Power Offset for $2^{nd}$ Stream, 1 TB

In this example, it is assumed that the WRTU receives a single grant from the network with the additional power offset indication for the $2^{nd}$ stream but this time a single HARQ process is used (and thus a single TB is transmitted even during dual stream operations). The WRTU may adapt the data rate on the secondary stream based on the power offset indication for the second stream.

In this example procedure for this scenario, the WRTU may follow the following procedure (in any order or combination). The WRTU calculates the set of supported E-TFCs for the primary stream, assuming single stream transmission and also assuming dual-stream transmission. This may be carried out for example using the methods described above. If there are no HARQ retransmissions, the WRTU determines how many streams to use in the upcoming E-DCH transmission. This may be carried out using the methods described above. If the WRTU determines that single-stream transmission should be used then the WRTU executes the remaining part of the E-TFC selection procedure may be executed for the primary stream using the set of supported E-TFCs calculated assuming single-stream transmission. The WRTU then creates a single PDU and delivers it to the physical layer for transmission over a single stream. Otherwise, if the WRTU determines that dual-stream transmission should be used and the WRTU may execute an E-TFC selection procedure, where the maximum supported payload is calculated according to the method described above assuming a single transport block case. The WRTU MAC layer may deliver the PDU(s) to be transmitted to the physical layer, where the WRTU applies the appropriate physical channel processing to map the PDU to the TF selected. The WRTU may be configured to use the same transport format on both streams. Alternatively, the WRTU determines the transport format for each stream independently. The WRTU physical layer may apply the existing rate matching (including puncturing or repeating) to both streams independently. To determine the number of bits mapped to each of the stream, the WRTU may use one (or a combination) of the following approaches. The WRTU may determine the number of coded bits that is to be transmitted on each stream based on the proportion of the TBS for each stream. Alternatively, the WRTU may determine the number of coded bits that is to be transmitted.

8.3 Example 3: Dual Grants

In this example, the WRTU is configured with two serving grants, one per stream. Therefore, the WRTU transmits up to two TB simultaneously over two HARQ processes when configured with dual-stream operations. This can operate similar to DC-HSUPA. For restriction, the power may be split according to grants (e.g. like DC-HSUPA). Or it may always split, regardless of how many transmissions are requested. Although, the case where too much power is allocated to the second stream (e.g. the first stream is retransmitting) should be avoided. In some embodiments, a pre-allocation technique may be used. Selection may be conventional (DC-HSUPA). The data in the buffer may be filled conventionally. Physical channel mapping may be performed independently, thereby allowing any TF combination.

It is possible to derive a "grant" from a second power offset, whereby example 1 and example 3, above, become similar.

It should be noted that this approach may be less in-line with current simulation methodology where equal power is assumed for the two streams.

8.4 Example 4: Open Loop Operations

In this scenario, the WRTU is configured to operate in dual-stream open loop operations. The WRTU receives no additional information from the network with respect to the quality of the second stream. The WRTU may on the other hand receive dynamic or semi-static rank indication by the NodeB. When the WRTU is configured for dual-stream or rank-2 transmission, the WRTU may follow the following procedure. The WRTU may determine the set of supported E-TFCs based on any suitable approach. For example, the WRTU may be configured to use a different E-TFCI and power offset reference table when configured for rank-2 transmission. The WRTU performs E-TFC selection using the conventional approach; the MAC layer delivers a PDU to the physical layer. The WRTU applies channel coding using the conventional approach. In addition to physical channel segmentation, interleaving and physical channel mapping, the WRTU also applies physical layer mapping and optionally layer permutation.

9. Example Transmitter Structures to Support Single Power Control Loop

Fast power control is important to interference-limited systems such as HSUPA. There is one power control loop in existing HSUPA system which supports only single-stream transmission. For MIMO HSUPA that supports dual-stream transmission, to save signaling overhead, it is desirable to have single power control loop.

9.1 Single TB Physical Layer Channel Processing

Figure 4:
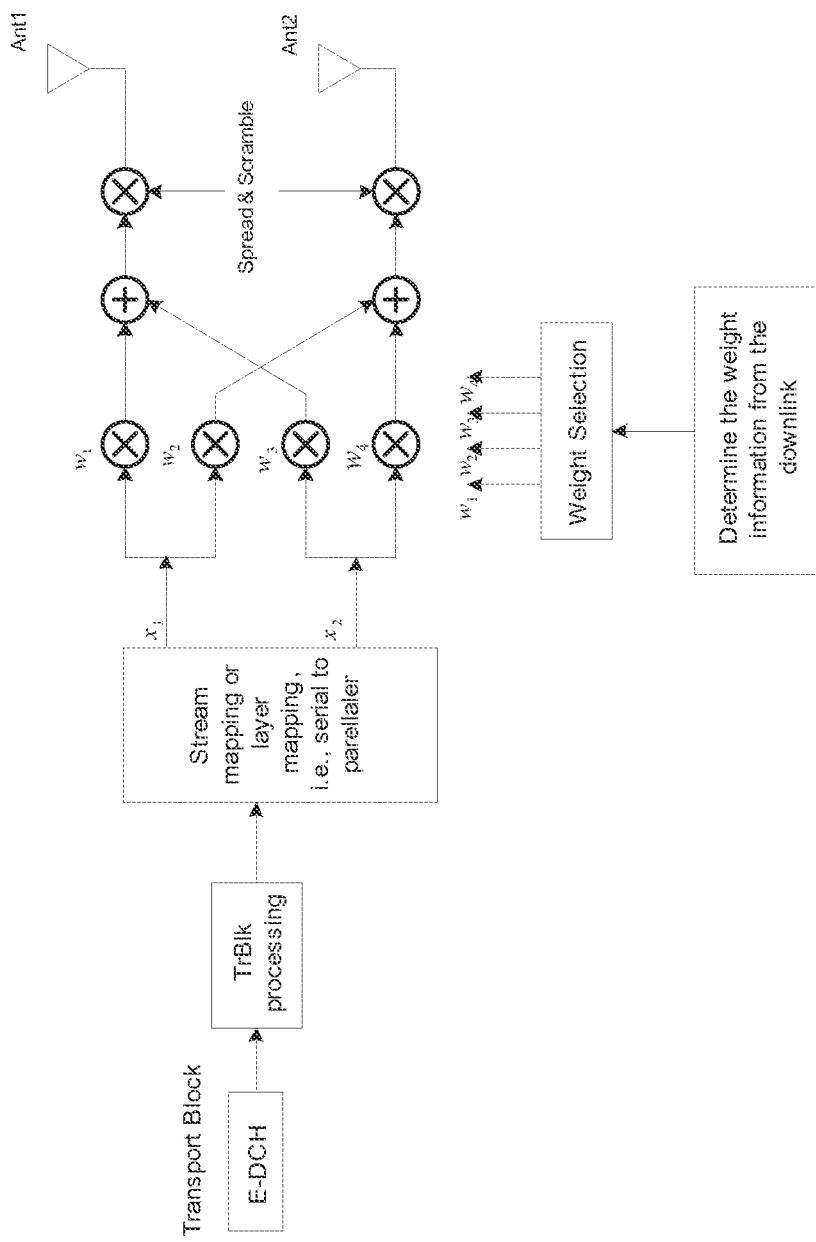
FIG. 4 is an example HSUPA transmitter structure for closed-loop mode single E-DCH transport block transmission.

This can be achieved, as the first method, by transmitting only one E-DCH transport block whose modulation symbols are split over two streams, as shown in FIG. 4 at a high level, which illustrates an example HSUPA transmitter structure for closed-loop mode single E-DCH transport block transmission.

At a high level, the WRTU first encodes the TB using the existing channel coder, selects a transport format and applies rate matching. The transport block to stream or layer mapping processing may carried out in a number of different ways.

In a first approach to layer mapping the processing is carried out as part of the physical channel segmentation for E-DCH. The WRTU determines the total number of E-DPDCH across all layers and uses this value for "P" in the conventional physical channel segmentation procedure.

In the open loop MIMO approach, the WRTU may be configured to apply the same number of E-DPDCH for each layer (and use the same transport format on each layer) when dual-stream is transmission is used.

In an option, the WRTU alternates the layers between HARQ retransmissions.

9.2 Dual TB Physical Layer Channel Processing

Figure 5:
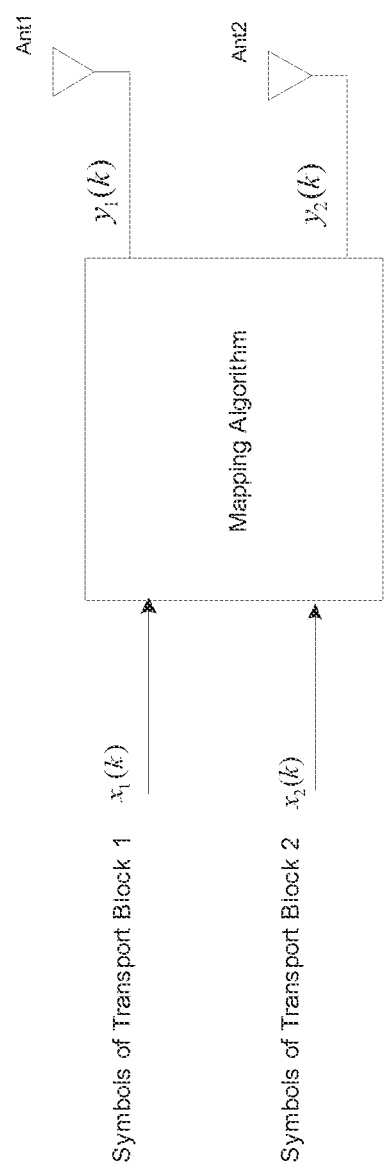
FIG. 5 is a mapping between modulation symbols of two transport blocks and symbol level signals at two physical antennas.

Another approach is transmitting two E-DCH transport blocks, one over each stream. To have only one power control loop, the channel qualities seen by the two streams should be the same. Without loss of generality, it is assumed in the following across one TTI only one channelization code is required for each transport block, single-code per transport block. Denote $\{x_1(k)\}_{k=o}^{M-1}$ as the M codeword modulation symbols that are contained in the first transport block. Similarly, $\{x_2(k)\}_{k=o}^{M-1}$ may be defined as the M codeword modulation symbols that are contained in the second transport block. Also the precoding matrix may be defined as:

$$W = \begin{bmatrix} w_1 & w_3 \\ w_2 & w_4 \end{bmatrix} \equiv [\, w_1 \quad w_2 \,]$$

and $\{y_1(k)\}_{k=o}^{M-1}$ and $\{y_2(k)\}_{k=o}^{M-1}$ are symbol level outputs at physical antenna 1 and 2, respectively, as shown in FIG. 5, which illustrates mapping between modulation symbols of two transport blocks and symbol level signals at two physical antennas (precoding is part of the mapping). Mapping between modulation symbols of two transport blocks and symbol level signals at two physical antennas (precoding is part of the mapping). In order to make the two transport blocks experience the same physical layer channel quality after passing through the MIMO wireless channel, the following algorithm may be used at the symbol level to map between the outputs at two physical antennas and codeword modulation symbols at symbol time k and k+1

$$y(k) = \begin{bmatrix} y_1(k) \\ y_2(k) \end{bmatrix} = x_1(k)w_1 + x_2(k)w_2 = W \begin{bmatrix} x_1(k) \\ x_2(k) \end{bmatrix},$$

and $$y(k+1) = \begin{bmatrix} y_1(k+1) \\ y_2(k+1) \end{bmatrix}$$
$$= x_2(k+1)w_1 + x_1(k+1)w_2$$
$$= W \begin{bmatrix} x_2(k+1) \\ x_1(k+1) \end{bmatrix}$$

Note that it is assumed that the precoding matrix W does not change at symbol time k and k+1.

Figure 6:
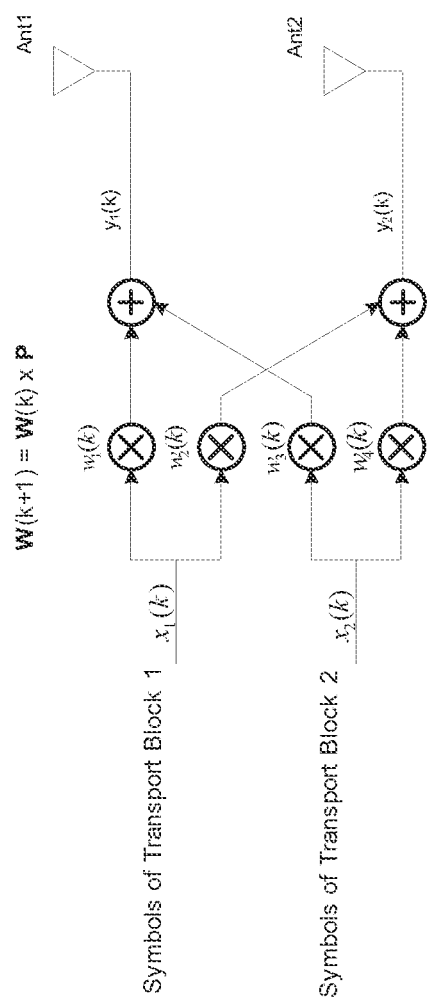
FIG. 6 illustrates a first implementation of the disclosed mapping algorithm.

The mapping can be achieved by alternating the precoding weights across two streams in symbol level so that two streams have equal quality as shown in FIG. 6, which illustrates a first implementation of the disclosed mapping algorithm. More specifically, two different pre-coding matrixes W(k) and W (k+1) are applied at symbol time k and symbol time k+1, respectively, to the two independent transport blocks. W(k) and W(k+1) are related by $$W(k+1) = W(k) \times P$$

where P is the permutation matrix $$P = \begin{bmatrix} 0 & 1 \\ 1 & 0 \end{bmatrix}.$$

Figure 7:
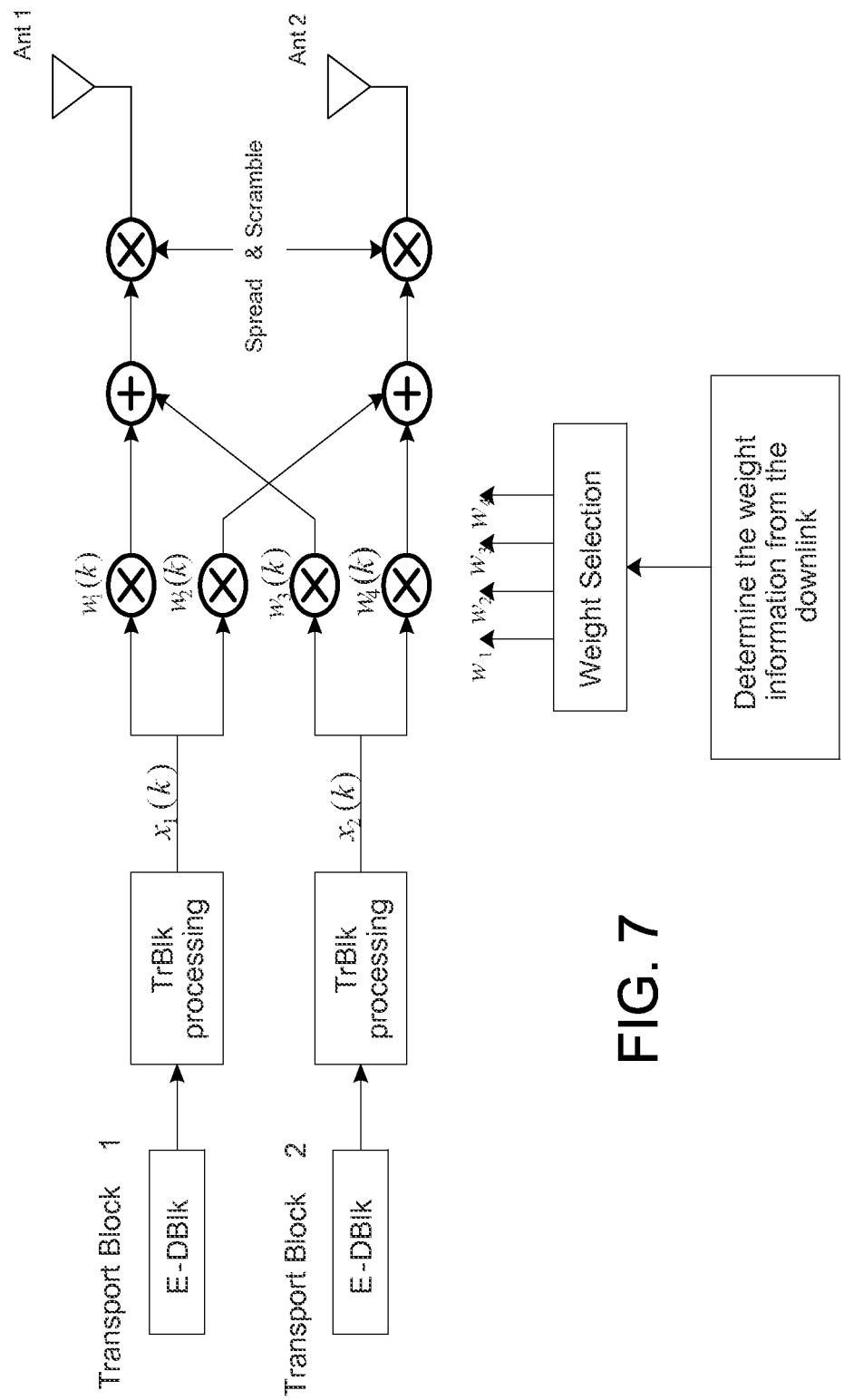
FIG. 7 illustrates how to apply this implementation to HSUPA transmitter structure for closed-loop mode dual-stream transmission.

FIG. 7 illustrates how to apply this implementation to HSUPA transmitter structure for closed-loop mode dual-stream transmission. Particularly, FIG. 7 illustrates an example HSUPA transmitter structure for closed-loop mode dual E-DCH transport block transmission (single-code, implementation 1 of mapping algorithm). Note that spreading and scrambling operation can be moved to transport block processing block (TrBlk processing) which will not affect the symbol level signaling mapping relationship as defined in the mapping algorithm. The pre-coding matrix W(k) and therefore W(k+1) for the transmission in the current TTI or slot can be switched to a different pre-coding matrix pairs $\tilde{W}$(k) and $\tilde{W}$(k+1) for the transmission in the next TTI or slot based on the channel state information signaled from the downlink.

Figure 8:
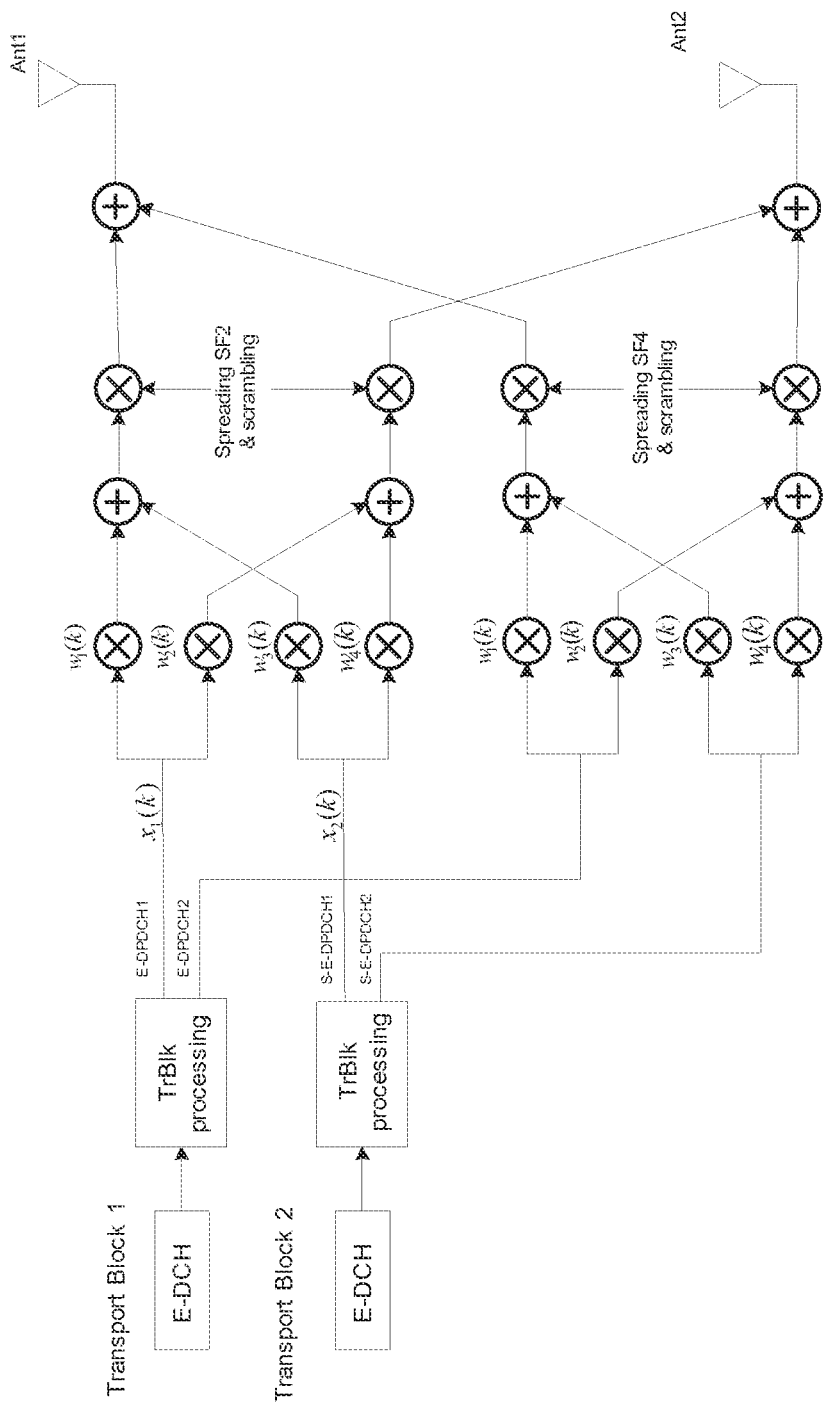
FIG. 8 is an example HSUPA transmitter structure for dual E-DCH transport block transmission.

If two or multiple channelization codes are required for each transport block, for example, as shown in FIG. 8, where E-DPDCH1 and S-E-DPDCH1 share channelization code SF2 and E-DPDCH2 and S-E-DPDCH2 share a different channelization code SF4, the mapping algorithm is applied twice, one to modulation symbols transmitted on E-DPDCH1 and S-E-DPDCH1, the other to modulation symbols transmitted on E-DPDCH2 and S-E-DPDCH2. FIG. 8 illustrates an example HSUPA transmitter structure for dual E-DCH transport block transmission (multi-code, implementation 1 of mapping algorithm). The disclosed mapping algorithm can also be implemented by mapping the modulation symbols of two transport blocks without alternating the precoding weights across two streams in symbol level. The codeword or transport block symbol mapping is shown in FIG. 9, which illustrates implementation 2 of the example mapping algorithm.

Figure 9:
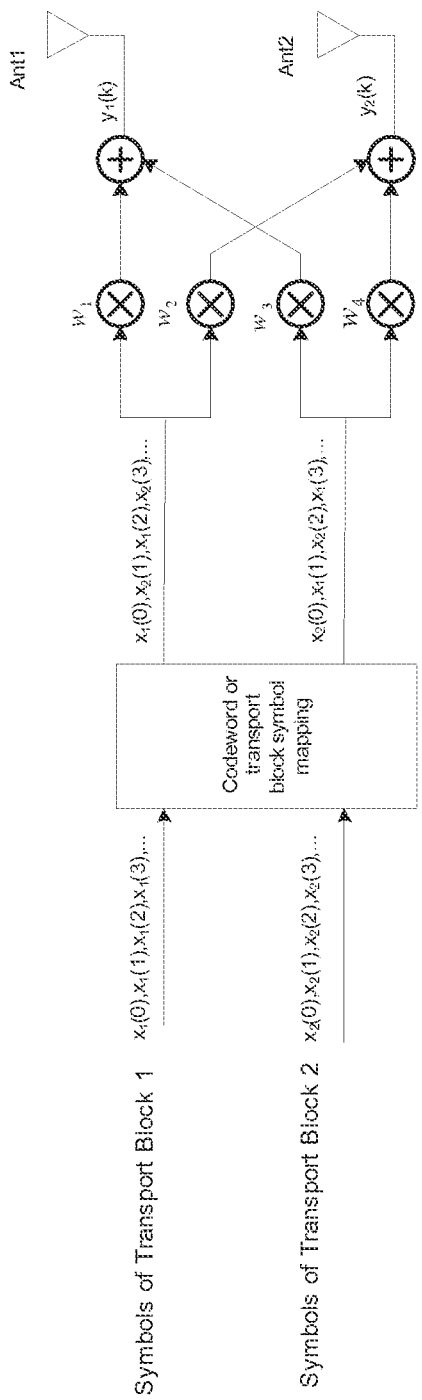
FIG. 9 illustrates a second implementation of the disclosed mapping algorithm.

Define $\{\tilde{x}_1(k)\}_{k=o}^{M-1}$ and $\{\tilde{x}_2(k)\}_{k=o}^{M-1}$ are the M modulation symbols at the output of symbol mapping block in FIG. 9. The symbol mapping block can be further described mathematically by a matrix P(k) at symbol time index k $$P(k) = \begin{cases} \begin{bmatrix} 1 & 0 \\ 0 & 1 \end{bmatrix} & k \text{ is even} \\ \begin{bmatrix} 0 & 1 \\ 1 & 0 \end{bmatrix} & k \text{ is odd} \end{cases}$$

and the symbol permutation across two data streams or codewords that are transmitted on E-DPDCH and S-E-DPDCH, respectively, can be performed according to the following $$\tilde{x}(k) = \begin{bmatrix} \tilde{x}_1(k) \\ \tilde{x}_2(k) \end{bmatrix} = P(k) \begin{bmatrix} x_1(k) \\ x_2(k) \end{bmatrix}, k = 0, 1, \ldots, M-1$$

Figure 10:
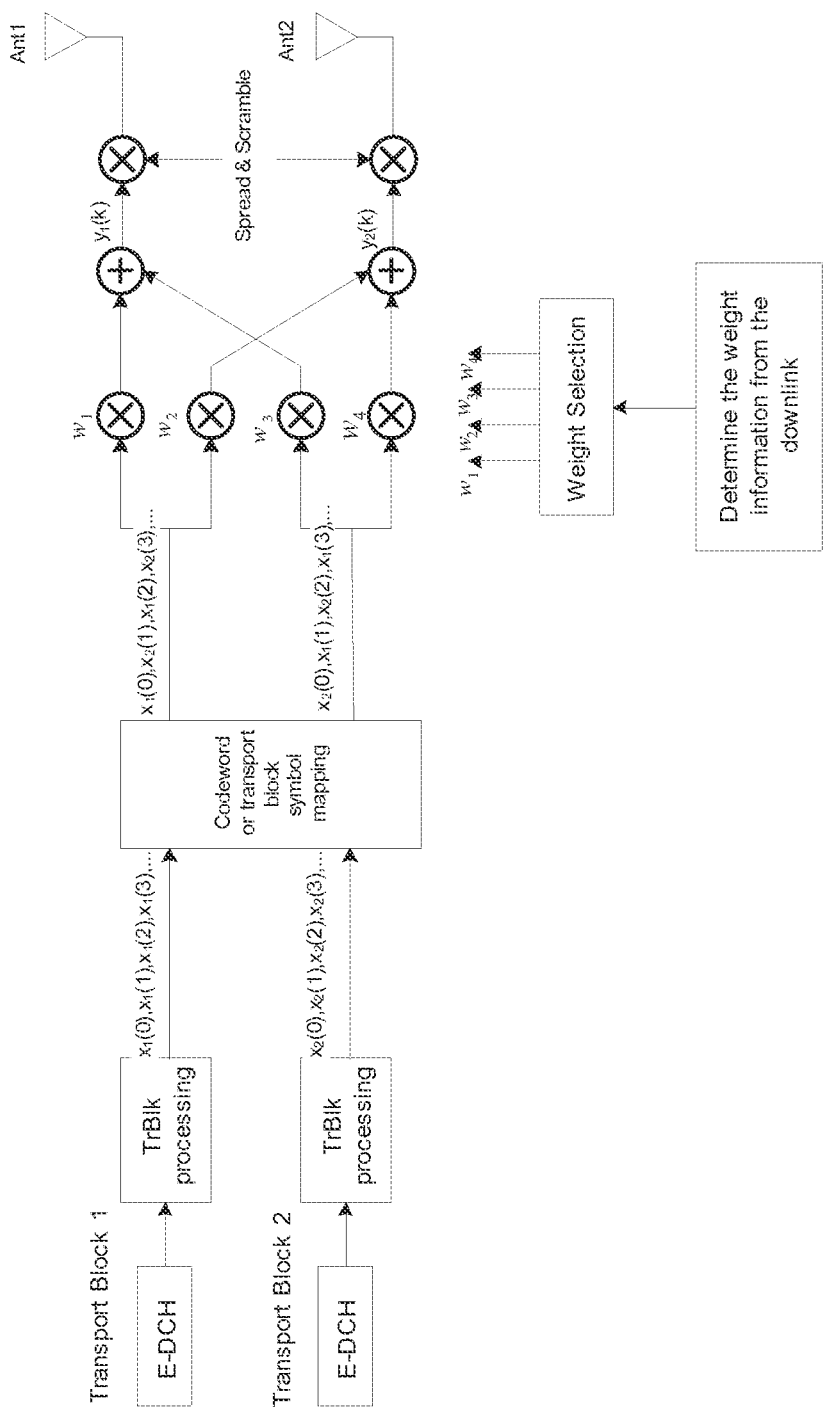
FIG. 10 is an example HSUPA transmitter structure for closed-loop mode dual E-DCH transport block transmission.

FIG. 10 shows how to apply this implementation to HSUPA transmitter structure for closed-loop mode dual-stream transmission. FIG. 10 illustrates an example HSUPA transmitter structure for closed-loop mode dual E-DCH transport block transmission (single-code, implementation 2 of mapping algorithm).

Example Operating Environment

Figure 11A:
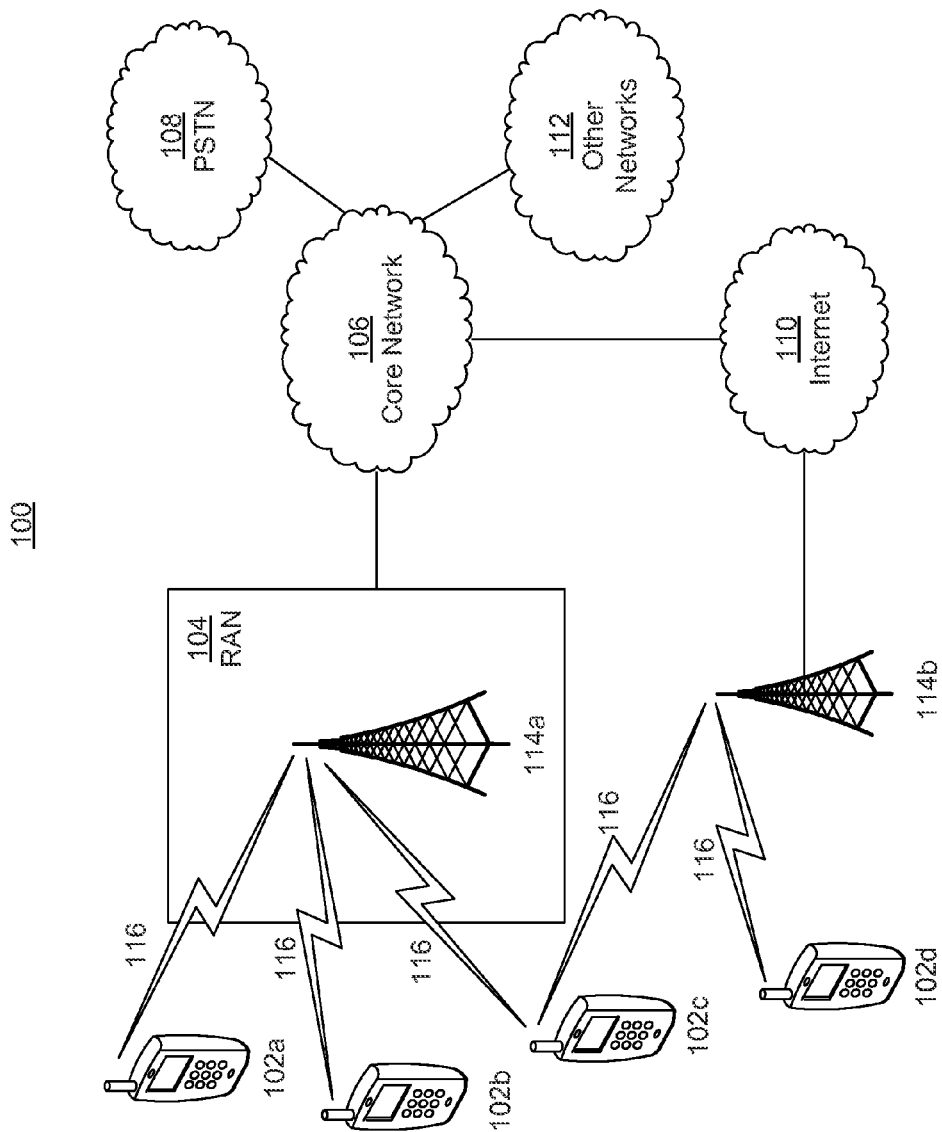
FIG. 11A is a system diagram of an example communications system in which one or more disclosed embodiments may be implemented.

FIG. 11A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 11A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WRTU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 11A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 11A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 11A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 11A may be configured to communicate with the base station 114a, which may employ a cellular-based radio technology, and with the base station 114b, which may employ an IEEE 802 radio technology.

Figure 11B:
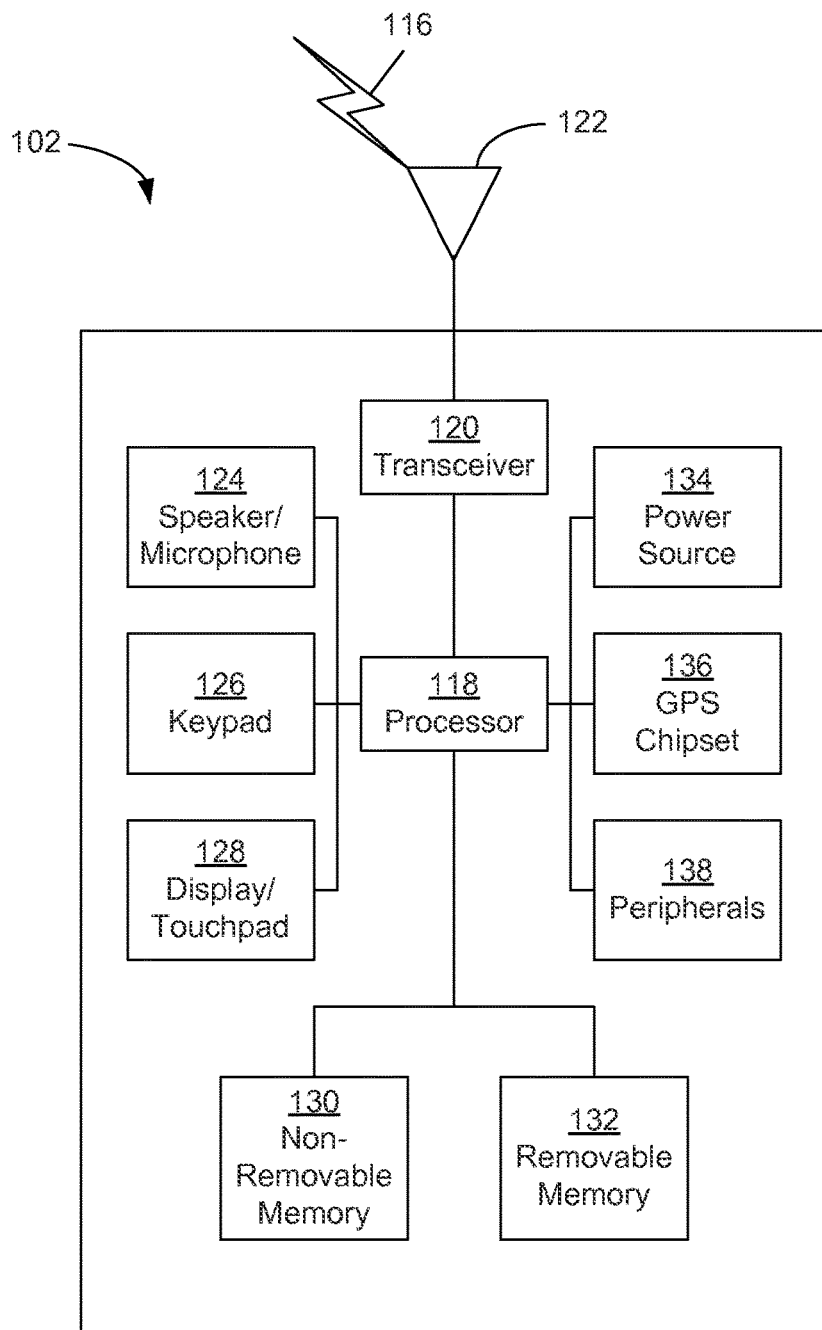
FIG. 11B is a system diagram of an example wireless transmit/receive unit (WTRU) that may be used within the communications system illustrated in FIG. 11A.

FIG. 11B is a system diagram of an example WTRU 102. As shown in FIG. 11B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 11B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 11B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 11C:
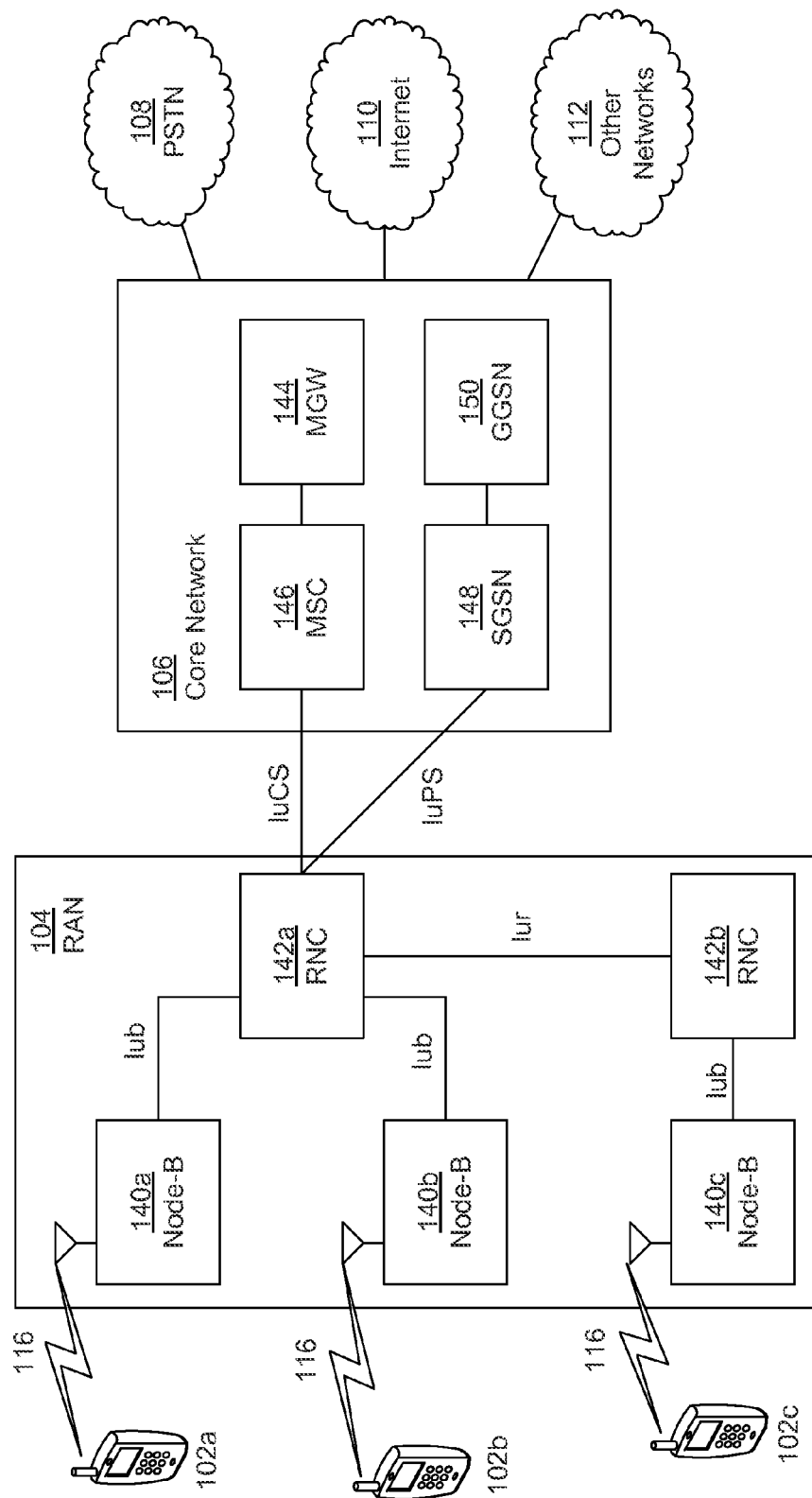
FIG. 11C is a system diagram of an example radio access network and an example core network that may be used within the communications system illustrated in FIG. 11A.

FIG. 11C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 11C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 11C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 11C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 11D:
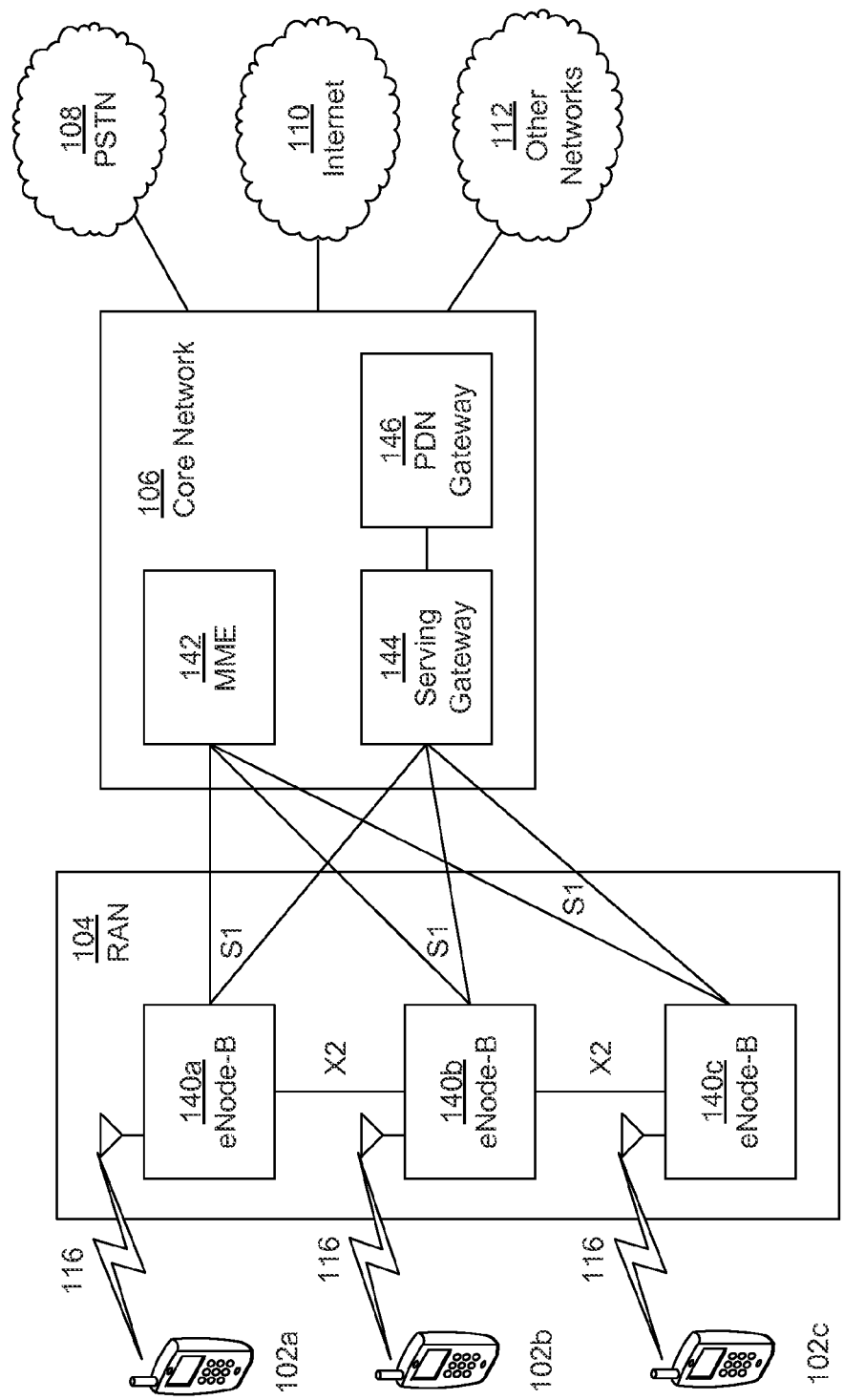
FIG. 11D is a system diagram of another example radio access network and an example core network that may be used within the communications system illustrated in FIG. 11A.

FIG. 11D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 11D, the eNode-Bs 140a, 140b, 140c may communicate with one another over an X2 interface.

The core network 106 shown in FIG. 11D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 11E:
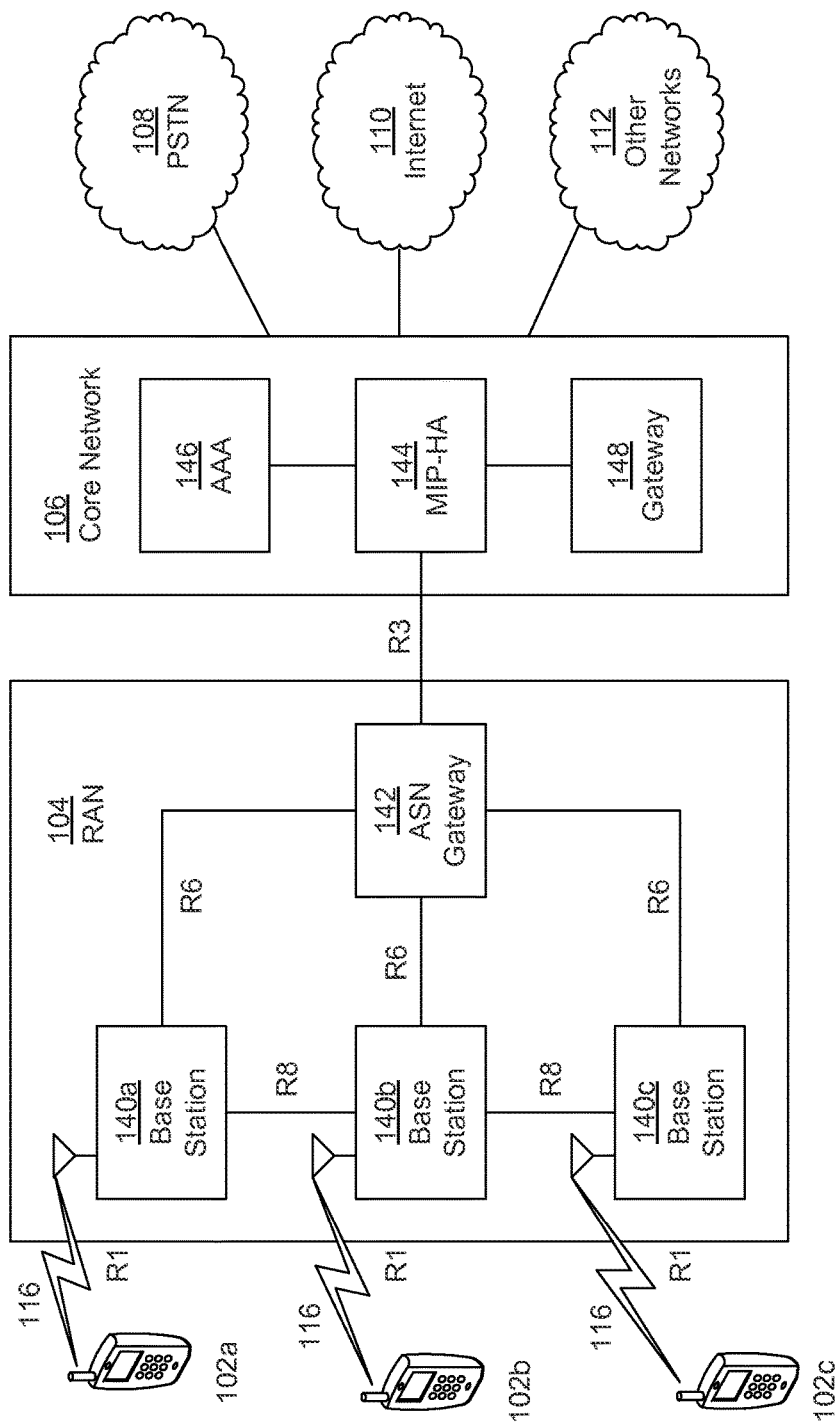
FIG. 11E is a system diagram of another example radio access network and an example core network that may be used within the communications system illustrated in FIG. 11A.

FIG. 11E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 11E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 11E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 11E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the exemplary embodiments are not limited to the above-mentioned memories and that other platforms and memories may support the described methods.

No element, act, or instruction used in the description of the present application should be construed as critical or essential unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

Although the systems and methods herein has been described in terms of a UWB multi-band communication system, it is contemplated that it may be implemented in software on microprocessors/general purpose computers (not shown). In certain embodiments, one or more of the functions of the various components may be implemented in software that controls a general purpose computer.

What is claimed:

1. A method implemented in a Wireless Transmit/Receive Unit (WTRU) for transport format combination selection for uplink (UL) Multiple Input Multiple Output (MIMO) operations comprising a primary stream and a secondary stream, the method comprising:

calculating a Normalized Remaining Power Margin (NRPM) applicable to the primary stream;

calculating a set of supported Enhanced Transport Format Combination Indices (E-TFCIs) for the primary stream based on the NRPM;

selecting one of the supported E-TFCIs for the primary stream;

determining a rank for UL transmissions based on at least a threshold; and if the rank is 2, determining a number of bits of data on the secondary stream based on the selected primary stream E-TFCI and an offset signaled by a NodeB;

wherein the offset is based on a Δ MIMO signaled by the NodeB, wherein Δ MIMO is a relative difference between the primary stream and the secondary stream.

2. The method of claim 1 wherein the determining of the number of bits of data on the secondary stream comprises determining a transport block size for the secondary stream.

3. The method of claim 1 wherein the determining of the number of bits of data on the secondary stream comprises determining an E-TFCI for the secondary stream.

4. The method of claim 1 further comprising:
transmitting non-scheduled data on the primary stream.

5. The method of claim 1 wherein calculating the NRPM applicable to the primary stream comprises calculating half of a total NRPM for at least one E-TFCI.

6. The method of claim 1 wherein the calculating the NRPM applicable to the primary stream comprises calculating:

$$NRPM_{1,j} = 0.5*(PMax_j - P_{DPCCH,target} - P_{S\text{-}DPCCH,target} - P_{DPDCH} - P_{HS\text{-}DPCCH} - P_{E\text{-}DPCCH,j} - P_{S\text{-}E\text{-}DPCCH,j})/P_{DPCCH,target}$$

where:
NRPM$_{1,j}$ is the Normalized Remaining Power Margin applicable to the primary stream;
PMax$_j$ is a maximum power allowed;
P$_{DPCCH,target}$ is an estimated Dedicated Physical Data Channel (DPCCH) power target;
P$_{S-DPCCH,target}$ is an estimated Secondary (S)-DPCCH power target;
P$_{DPDCH}$ is the power of the DPDCH;
P$_{HS-DPCCH}$ is the power of the High Speed (HS)-DPCCH;
P$_{E-DPCCH,j}$ is the power of the E-DPCCH for E-TFCIj on the primary stream; and
P$_{S-E-DPCCH,j}$ is the power of the secondary stream E-DPCCH (S-DPCCH) for E-TFCIj on the primary stream.

7. The method of claim 1 wherein the threshold comprises a number of bits that can be transmitted on the secondary stream.

8. The method of claim 7 wherein the determining the rank is further based on a secondary power offset.

9. The method of claim 7 wherein determining the number of bits of data on the secondary stream comprises:
calculating the number of bits that can be transmitted on the secondary stream using a HARQ offset associated with a highest priority non-empty logical channel.

10. The method of claim 7 further comprising: receiving the threshold via Radio Resource Control (RRC) signaling.

11. The method of claim 1 wherein the threshold comprises a number of bits that can be transmitted on the secondary stream according to a serving grant.

12. The method of claim 1 wherein the offset is based on a received power as measured by the NodeB.

13. A Wireless Transmit/Receive Unit (WTRU) comprising:
a transmitter;
a receiver; and
a processor configured to perform transport format combination selection for uplink (UL) Multiple Input Multiple Output (MIMO) operations comprising a primary stream and a secondary stream, by:
calculating a Normalized Remaining Power Margin (NRPM) applicable to the primary stream;
calculating a set of supported Enhanced Transport Format Combination Indices (E-TFCIs) for the primary stream based on the NRPM;
selecting one of the supported E-TFCIs for the primary stream;
determining a rank for UL transmissions based on at least a threshold; and if the rank is 2, determining a number of bits of data on the secondary stream based on the selected primary stream E-TFCI and an offset signaled by a NodeB;
wherein the offset is based on a Δ MIMO signaled by the NodeB, wherein Δ MIMO is a relative difference between the primary stream and the secondary stream.

14. The WTRU of claim 13 wherein the processor is configured to determine the number of bits of data on the secondary stream by determining a transport block size for the secondary stream.

15. The WTRU of claim 13 wherein the processor is configured to determine the number of bits of data on the secondary stream by determining an E-TFCI for the secondary stream.

16. The WTRU of claim 13 wherein the processor is further configured to cause the transmitter to transmit non-scheduled data only on the primary stream.

17. The WTRU of claim 13 wherein the processor is configured to calculate the NRPM applicable to the primary stream by calculating half of a total NRPM for at least one E-TFCI.

18. The WTRU of claim 13 wherein the processor is configured to calculate the NRPM applicable to the primary stream by calculating:

$$NRPM_{1,j} = 0.5*(PMax_j - P_{DPCCH,target} - P_{S-DPCCH,target} - P_{DPDCH} - P_{HS-DPCCH} - P_{E-DPCCH,j} - P_{S-E-DPCCH,j})/P_{DPCCH,target}$$

where:
NRPM$_{1,j}$ is the Normalized Remaining Power Margin applicable to the primary stream;
PMax$_j$ is a maximum power allowed;
P$_{DPCCH,target}$ is an estimated Dedicated Physical Data Channel (DPCCH) power target;
P$_{S-DPCCH,target}$ is an estimated Secondary (S)-DPCCH power target;
P$_{DPDCH}$ is the power of the DPDCH;
P$_{HS-DPCCH}$ is the power of the High Speed (HS)-DPCCH;
P$_{E-DPCCH,j}$ is the power of the E-DPCCH for E-TFCIj on the primary stream; and
P$_{S-E-DPCCH,j}$ is the power of the secondary stream E-DPCCH (S-DPCCH) for E-TFCIj on the primary stream.

19. The WTRU of claim 13 wherein the threshold comprises a number of bits that can be transmitted on the secondary stream.

20. The WTRU of claim 19 wherein the WTRU receives the threshold via Radio Resource Control (RRC) signaling.

21. The WTRU of claim 13 wherein the threshold comprises a number of bits that can be transmitted on the secondary stream according to a serving grant.

22. The WTRU of claim 19 wherein the processor is configured to determine the rank further based on a secondary power offset.

23. The WTRU of claim 19 wherein the processor is configured to calculate the number of bits that can be transmitted on the secondary stream using a HARQ offset associated with a highest priority non-empty logical channel.

24. The WTRU of claim 13 wherein the offset is based on a received power as measured by the NodeB.

* * * * *